(12) United States Patent
Hodge

(10) Patent No.: US 6,647,161 B1
(45) Date of Patent: Nov. 11, 2003

(54) STRUCTURAL MONITORING SENSOR SYSTEM

(76) Inventor: Malcolm H. Hodge, 485 Mountain Rd., West Hartford, CT (US) 06117

( * ) Notice: Subject to any disclaimer, the term of this patent is extended or adjusted under 35 U.S.C. 154(b) by 0 days.

(21) Appl. No.: 10/293,811

(22) Filed: Nov. 13, 2002

Related U.S. Application Data

(62) Division of application No. 09/772,182, filed on Jan. 29, 2001, now Pat. No. 6,487,914, which is a division of application No. 09/481,289, filed on Jan. 11, 2000, now Pat. No. 6,181,841, which is a division of application No. 09/097,268, filed on Jun. 15, 1998, now Pat. No. 6,012,337, which is a continuation of application No. PCT/US96/20015, filed on Dec. 13, 1996.

(60) Provisional application No. 60/011,164, filed on Feb. 5, 1996, and provisional application No. 60/008,687, filed on Dec. 15, 1995.

(51) Int. Cl.[7] .................................................. G02B 6/00
(52) U.S. Cl. ............................................ 385/12; 385/13
(58) Field of Search ....................................... 385/12, 13

(56) References Cited

U.S. PATENT DOCUMENTS

| | | | |
|---|---|---|---|
| 3,595,072 A | | 7/1971 | Richards |
| 4,602,155 A | | 7/1986 | LaPlante |
| 4,619,143 A | | 10/1986 | Franken |
| 4,647,769 A | | 3/1987 | Stone et al. |
| 4,654,520 A | * | 3/1987 | Griffiths ................ 250/227.14 |
| 4,678,908 A | | 7/1987 | LaPlante |
| 4,703,255 A | | 10/1987 | Strommen |
| 4,713,540 A | | 12/1987 | Gilby et al. |
| 4,812,645 A | * | 3/1989 | Griffiths ................ 250/227.14 |
| 4,814,601 A | | 3/1989 | Jones |
| 4,927,503 A | | 5/1990 | Polly |
| 4,958,130 A | | 9/1990 | Mochizuki et al. |
| 4,996,419 A | | 2/1991 | Morey |
| 5,026,141 A | * | 6/1991 | Griffiths ...................... 385/13 |
| 5,065,017 A | | 11/1991 | Hoech |
| 5,069,774 A | | 12/1991 | Hladky et al. |
| 5,096,277 A | | 3/1992 | Kleinerman |
| 5,179,485 A | | 1/1993 | Tamayama |

(List continued on next page.)

FOREIGN PATENT DOCUMENTS

| | | | | |
|---|---|---|---|---|
| EP | 0 503 986 A1 | | 9/1992 | |
| GB | 2262803 A | * | 6/1993 | ........... G01B/11/16 |
| WO | WO 93/25866 | * | 12/1993 | ............ G01D/5/26 |

OTHER PUBLICATIONS

Russell O. Stanton, *Digital Optical Transducers for Helicopter Flight Control Systems*, pp. 122–129, 1984.
Wilbur Hicks, *Fiber Optic Bus–Organized Systems for Sensors Data Acquisition and Validation*, pp. 1–17, 1990–1.
Marcos Kleinerman et al., *A Distributed Force–Sensing Optical Fiber Using Forward Time Division Multiplexing*, pp. 67–77, 1991.

Primary Examiner—Akm Enayet Ullah
Assistant Examiner—Michelle R. Connelly-Cushwa
(74) Attorney, Agent, or Firm—Blodgett & Blodgett, P.C.

(57) ABSTRACT

The present invention is directed to a system for continuous physical integrity monitoring of large civil structures such as bridges and high-rise buildings . . . wherein the relevant sensor data stream is generated continuously and transmitted to the data gathering location without the need for an incoming triggering signal of any kind; i.e., it is a one way transmission system. Specifically, it is a concept for an interlinked multi-parameter Early Warning Sensor system with a full time data management capability for structures. The invention is also directed to both the system construction, with its communication capability, and also designs of specific sensors applicable to the system as a whole. As a practical example of application of the present invention to a structure, the description in this application is directed primarily towards system applications for bridge integrity early warning systems.

3 Claims, 25 Drawing Sheets

U.S. PATENT DOCUMENTS

| | | | |
|---|---|---|---|
| 5,182,449 A | * | 1/1993 | Johnson et al. ........ 250/227.14 |
| 5,208,162 A | | 5/1993 | Osborne et al. |
| 5,227,930 A | | 7/1993 | Thanos et al. |
| 5,259,944 A | | 11/1993 | Feliu et al. |
| 5,306,414 A | | 4/1994 | Glass et al. |
| 5,403,550 A | | 4/1995 | Wietek |
| 5,426,973 A | | 6/1995 | Hartt |
| 5,529,267 A | * | 6/1996 | Giras et al. .................. 246/120 |
| 5,594,819 A | * | 1/1997 | Narendran et al. ........... 385/12 |
| 5,895,843 A | | 4/1999 | Taylor et al. |
| 5,900,556 A | | 5/1999 | Ahmad et al. |
| 6,012,337 A | | 1/2000 | Hodge |

\* cited by examiner

FUSE TESTING RESULTS

| FUSE # 1 | ACTUAL CYCLES TO FAILURE | PREDICTED CYCLES | RATIO |
|---|---|---|---|
| Tine 1 | 297,000 | 250,000 | 1.18 |
| Tine 2 | 424,000 | 500,000 | 0.85 |
| Tine 3 | 588,000 | 750,000 | 0.78 |
| Tine 4 | 860,000 | 1,000,000 | 0.86 |
|  |  |  |  |
| FUSE # 2 |  |  |  |
| Tine 1 | 158,000 | 100,000 | 1.58 |
| Tine 2 | 148,000 | 145,000 | 1.02 |
| Tine 3 | 176,000 | 214,000 | 0.82 |
| Tine 4 | 636,000 | 315,000 | 1.98 |
|  |  |  |  |
| FUSE # 3 |  |  |  |
| Tine 1 | 88,000 | 100,000 | 0.88 |
| Tine 2 | 174,000 | 140,000 | 1.24 |
| Tine 3 | 198,000 | 160,000 | 1.23 |
| Tine 4 | 249,000 | 200,000 | 1.24 |

FIG. 46

STRUCTURAL MONITORING SENSOR SYSTEM

CROSS-REFERENCE TO RELATED APPLICATIONS

This application is a division of prior U.S. application Ser. No. 09/772,182, filed Jan. 29, 2001, now U.S. Pat. No. 6,487,914, which is a division of U.S. application Ser. No. 09/481,289, filed Jan. 11, 2000, now U.S. Pat. No. 6,181,841, which is a division of U.S. application Ser. No. 09/097,268, filed on Jun. 15, 1998, now U.S. Pat. No. 6,012,337, which is a continuation of application No. PCT/US96/20015, filed Dec. 13, 1996, which designated the United States of America and claimed the benefit under 35 U.S.C. 119(e) of U.S. Provisional Application No. 60/008,687, filed Dec. 15, 1995, and U.S. Provisional Application No. 60/011,164, filed Feb. 5, 1996.

STATEMENT REGARDING FEDERALLY SPONSORED RESEARCH OR DEVELOPMENT

This invention has been created without the sponsorship or funding of any federally sponsored research or development program.

BACKGROUND OF THE INVENTION

The present invention is directed to a system for continuous physical integrity monitoring of large civil structures such as bridges and high-rise buildings . . . wherein the relevant sensor data stream is generated continuously and transmitted to the data gathering location without the need for an incoming triggering signal of any kind;. i.e., it is a one way transmission system. Specifically, it is a concept for an interlinked multi-parameter Early Warning Sensor system with a full time data management capability for structures. The invention is also directed to both the system construction, with its communication capability, and also unique designs of specific sensors applicable to the system as a whole. As a practical example of application of the present invention to a structure, the description in this application is directed primarily towards system applications for bridge integrity early warning systems. However it should be understood that the system and its benefits may be applied to a wide range of physical structures.

The system of the present invention, as applied to bridges, is unique in its ability to address the four principal failure mechanisms or precursors to failure most commonly associated with bridges. These are:

1. Catastrophic failure where some major structural defect progresses undetected to the point where some critical section of the bridge collapses. This will be designated Slow Movement Failure.

2. Vibration-associated Failure where sporadic traffic loading creates a vibration environment which can accelerate failure, such as fatigue, and also be a diagnostic tool useful in predicting failure. This is designated Rapid Movement Failure.

3. Corrosion-induced Failure where the steady winter applications of salt eventually permeate the concrete to the depth of the rebars which begin to corrode. This weakens the rebars and also causes the concrete to spall off the bars. It also weakens the concrete. This is designated Corrosion Failure.

4. Low temperature-induced failure where a freezing road bed can lead to frost formation and resultant pot-hole development. Pot-holes can exaggerate the stress on the entire bridge structure through vehicular impact. This is designated Temperature Related Failure, and it is addressed through Temperature Sensing and Pot-Hole Sensing.

The present invention encompasses to major aspect of novelty. The first aspect is a harness which is attached permanently to a structure. This harness permits an array of interconnected transducers to be deployed at specific sites on the structure for specific sensing applications. It also provides the sensors with a common electro-optic interface which may be linked with a remote communication system . . . by a one-way data transmission system which does not require an incoming signal stimulus to trigger the sensor data download.

The second aspect relates to various types of the sensors which may be attached to this harness. Both analog and digital sensor types are described, and specific embodiments for corrosion monitoring, pothole monitoring, vibration monitoring and temperature monitoring are included in the present disclosure, as well as traffic flow, scour, bridge deck deflection, cross-wind velocity, temperature, fire, etc.

BRIEF DESCRIPTION OF THE DRAWINGS

FIG. 9 is the mask and FIG. 10 is the reticle with two tracks having the quadrature 90° offset;

FIG. 46 is a chart showing testing results for the fuse of FIGS. 44 and 45;

DETAILED DESCRIPTION OF THE INVENTION

OPTICAL MONITORING SYSTEM

The optical structural integrity monitoring system of the present invention includes a sensor interrogation harness which exploits a simple sensor differentiation technique known as Time Division Multiplexing, TDM. Since light travels through an optical fiber at a fixed velocity, each sensor is attached to the pulsed laser source by a different length of fiber. Further, by also causing the sensors' output to be reflected back down the same fiber to the photo-detector, the differential delay is precisely doubled.

Figure 1:
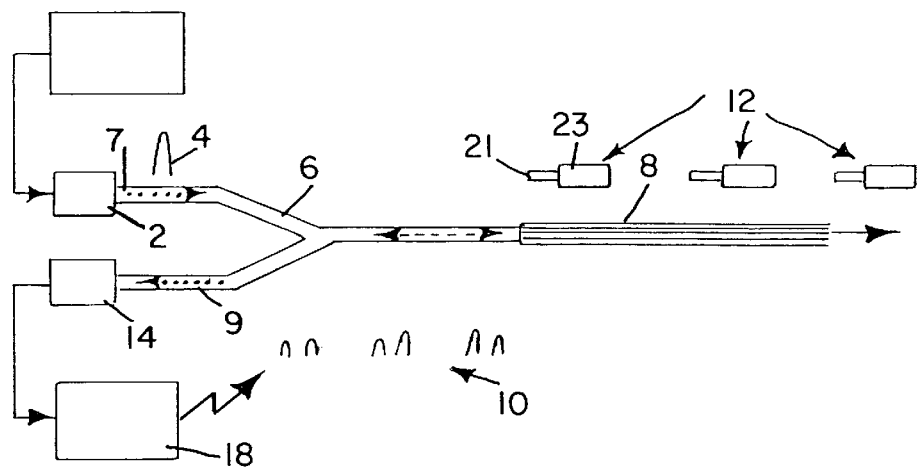
FIG. 1 is a diagrammatic general view of an optical monitoring system to which the present invention is applied.

Referring first to FIG. 1, the optical monitoring system of the present invention is generally indicated by the reference numeral 3 and includes a laser 2 which is capable of generating pulses of light 4 into one leg 7 of a Y-coupler coupler 6. The other leg of the coupler is connected to a photo detector 14 which, in turn, is operatively connected to circuitry 18. A cabled bundle of optical fibers 8, is connected to the Y-coupler 6. A single optical fiber from the cable 8 is connected to each of a plurality of optical sensors 12 located at strategic locations on the structure which is being monitored, in those instances where the direction of motion of the sensor is unambiguous. Each sensor has an "on", or reflecting condition and an 'off', or non-reflecting condition, to be described. Each light pulse from the laser 2 proceeds to the cables 20 and 22 via the coupler 6 to each of the sensors in the system. If a sensor is in its reflective condition, some tangible portion 10 of the light pulse will travel back down the same optical fiber and pass through the Y-coupler 6 and on to the photo detector 14 via the cable 9.

The circuitry 18, of the photo-detector is programmed to clock the arrival, or non-arrival depending on the sensor's condition, in certain time windows. These are known and programmed into the computer which will therefore know which sensor is responding in whatever mode, reflective (logical one), or non-reflective (logical zero). Because the laser 2 is pulsing at a frequency of up to half a million cycles per second, 0.5 MHZ, there is ample opportunity to capture the change from detectable signal to non-detectable without missing a step in the sequence.

Each optical sensor 12 is mounted on the structure to be monitored to detect the relative movement of a first element of the structure relative to a second element of the structure along a first axis. Each sensor comprises a probe 21 which is slidably mounted within a housing 23. The probe contains a transmissive grid, or reticle. The housing contains a reflective grid, or mask. The reticle moves longitudinally relative to the mask as the probe moves relative to the housing. An optical fiber from the fiber optic cable extends into the housing so that the end of the optical fiber is at the reticle for transmitting a pulse of light at a right angle to the reticle. Light passing through the transmissive areas of the reticle is reflected by the mask back to the end of the optical fiber. Such a sensor is known as a reflective optical sensor. The present invention is also applicable to a transmissive optical sensor which is similar to a reflective optical sensor except that the reflective areas of the mask are transmissive areas. Light from the optical fiber passes through the transmissive areas of the reticle and mask and strikes the end of a second optical fiber at the opposite side of the housing for transmission to the Y coupler. The probe is fixed to a first element of the structure to be monitored. The housing is fixed to the second element of the structure to be monitored.

The reticle and mask are located in separate spaced parallel planes. The mask is mounted in the encoder for movement relative to the reticle in accordance with the relative movement between the first and second elements of the structure to be monitored. The mask and the reticle function as an encoder for the light pulses received from the laser and reflected to the photo-detector 14. The reticle has a plurality of evenly spaced light impervious surfaces. The areas between the light impervious surfaces are pervious to light. The pervious areas are the active areas of the reticle and the light impervious areas are the passive areas of the reticle. The mask has a plurality of evenly spaced uniform reflective surfaces which are considered the active areas of the mask. The areas between the reflective surfaces are non-reflective and are considered the passive areas of the mask.

Figure 2:
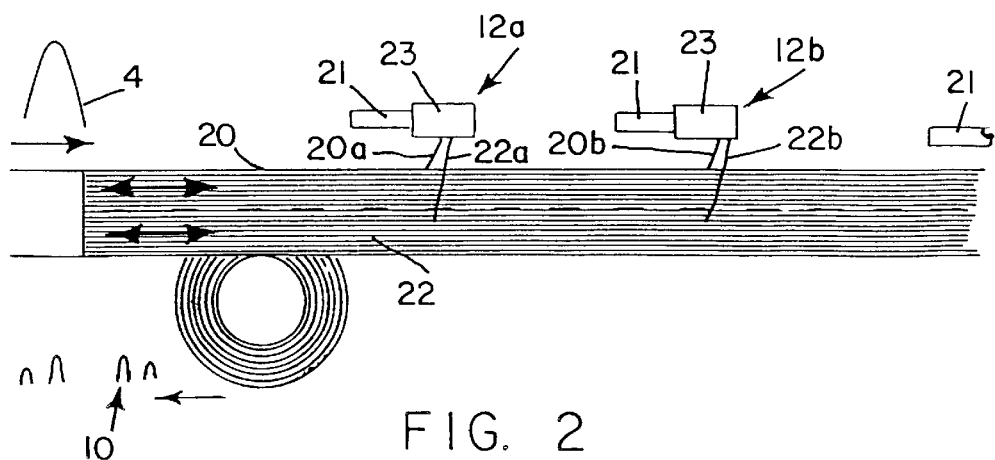
FIG. 2 is a diagrammatic view of a portion of the optical monitoring system which includes a feature of the present invention for determining direction of movement.

FIG. 2 shows a detail of the basic interrogation harness of FIG. 1 having to do with "quadrature", which allows the detection circuitry to be able to determine the direction of relative movement of the elements of the structure which are being monitored. The cable or bundle of optical fibers connected to the coupler 6 are divided into two groups of optical fibers, indicated by the reference numerals 20 and 22. A single optical fiber from each of the groups 20 and 22 is connected to each sensor 12 at various strategic locations along the structure to be monitored. As shown in FIG. 2, a single optical fiber 20a from the bundle of fibers 20 is connected to sensor 12a and a single fiber 22a from the bundle of optical fibers 22 is connected to sensor 12a. A single optical fiber 20b from the bundle of optical fibers 20 is connected to sensor 12b and a single optical fiber 22b from the optical fiber bundle 22 is connected to sensor 12b. The bundle of fibers, or cable 22 is configured to include an extra length, indicated by the reference numeral 25, immediately adjacent the Y-coupler 6. This enables any sensor in the system which requires a dual fiber quadrature feature may have a fiber selected, one from each of the two cables 20 and 22, at a specific physical location. The quadrature feature is described in greater detail hereinbelow in connection with FIGS. 9 and 10. The cables are sufficiently different in length so that their respective output pulses will be distinguishable via a TDM protocol.

Figure 3:
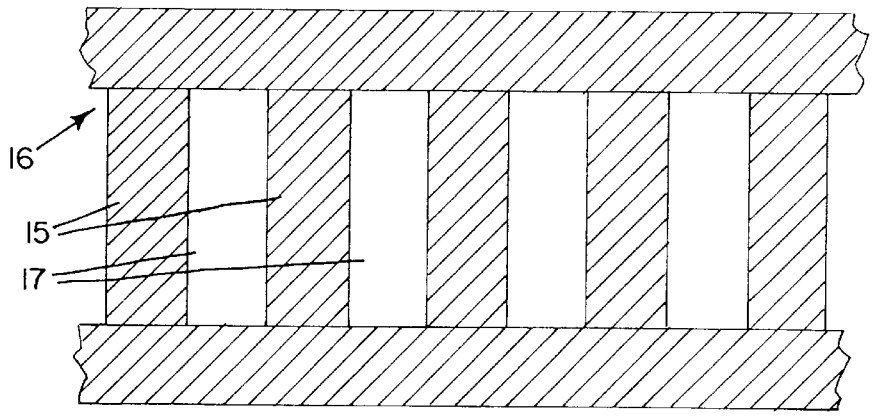
FIG. 3 is a diagrammatic view of a conventional encoder pattern for an optical sensor which forms part of the optical monitoring system.
Figure 4:
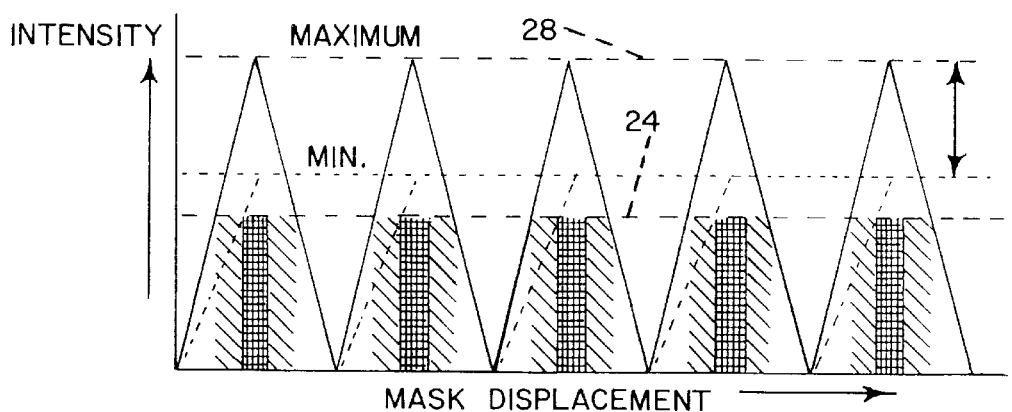
FIG. 4 is a chart showing relative displacement of the reticle and mask elements which form part of the optical sensor, plotted against reflected light intensity for the sensor encoder pattern of FIG. 3.
Figure 5:
FIG. 5 is a chart showing the digitizing of the reflected light signals of the chart of FIG. 4.

The encoder geometry of the reticle and mask of conventional sensors employ equal active and passive areas for the reticle and mask patterns as shown in FIG. 3, wherein each pattern, generally indicated by the reference numeral 16, has a plurality of active areas 15 which alternate with a plurality of passive areas 17. The result of employing two equal patterns, each having an equal active area to passive area ratio, creates a saw-tooth pattern output as shown in FIG. 4. In many structural applications, it is important to be able to monitor small relative movements between two structural elements. Therefore, it is desirable to have this "off" intervals of the sensor equal the "on" intervals as closely as possible. The problem is that it is necessary to be able to locate the half-height intensity of the saw tooth 24, FIG. 4, if one is to divide the output into equal on and off intervals, see 26, FIG. 5. This is normally accomplished by the technique of measuring the full peak height 28, FIG. 4, and conducting the mathematics in the circuitry of the light detection logic circuit. In order to be able to power a multiplicity of different fiber-sensor systems from a single source and detecting their outputs at a single detector, the present invention provides a low cost and simple approach which accommodates widely varying power level from sensor to sensor.

Figure 6:
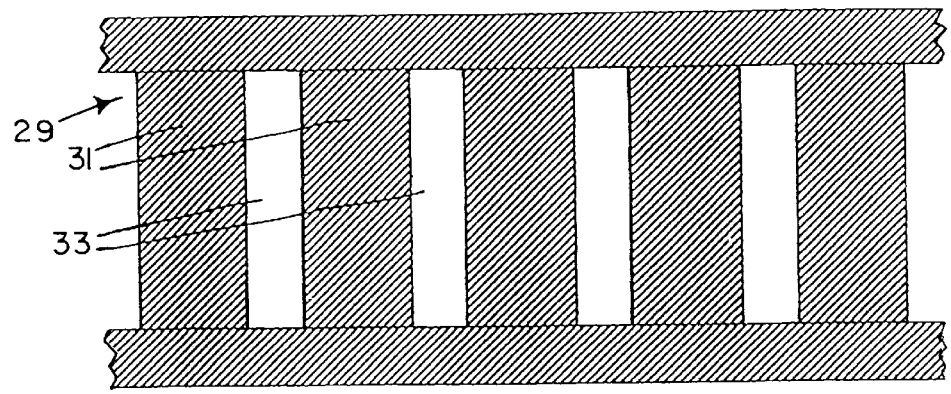
FIG. 6 is a diagrammatic view of a first embodiment of an encoder grid geometry for the reticle and mask of the optical sensor of the present invention.
Figure 7:
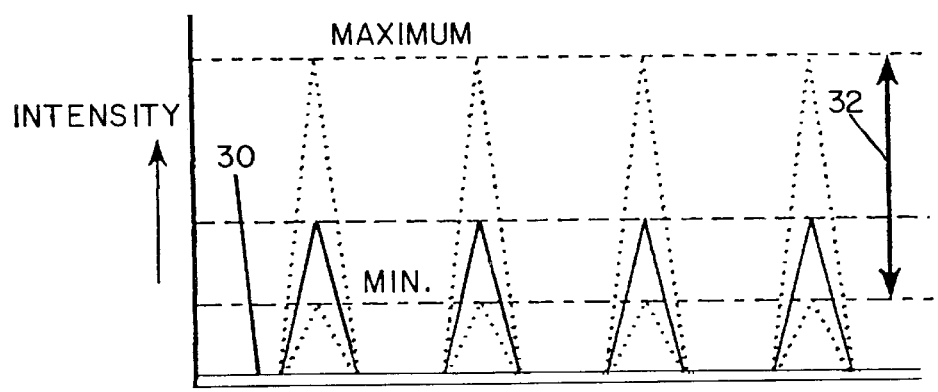
FIG. 7 is a chart showing relative displacement of the grid elements of the optical sensor plotted against reflected light for the encoder pattern of FIG. 6.
Figure 8:
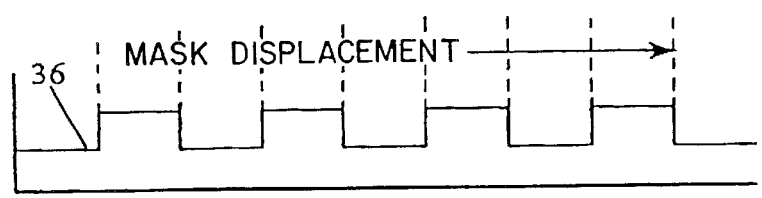
FIG. 8 is a chart showing the digitizing of the reflected light signals of the chart of FIG. 7.

The problems associated with conventional prior art sensors is overcome by the sensor 12 of the present invention. Each sensor 12 of the present invention includes a grid encoder design which differs substantially from those of conventional sensors. A first embodiment of applicant's encoder grid design is shown in FIG. 6, wherein the pattern or geometry of the reticle and the mask, generally indicated by the reference numeral 29, includes a plurality of equally spaced uniform active areas 33. The areas between the active areas 33, indicated by the reference numeral 31, are twice as wide as the active areas 33 along the longitudinal axis of the grid or the first axis. The active areas 33 of the reticle are the light pervious areas and the active areas of the mask are the reflective areas. This mask geometry automatically causes the light output to blink on and off in equal proportions by the expedient of keying off the baseline triggering signal level 30, FIG. 7, rather than the sensor-specific mid-height peak intensity. As shown in FIG. 7, the absolute peak height range 32, has little affect on this new baseline triggering protocol, as seen by the output signal 36, FIG. 8.

Figure 9:
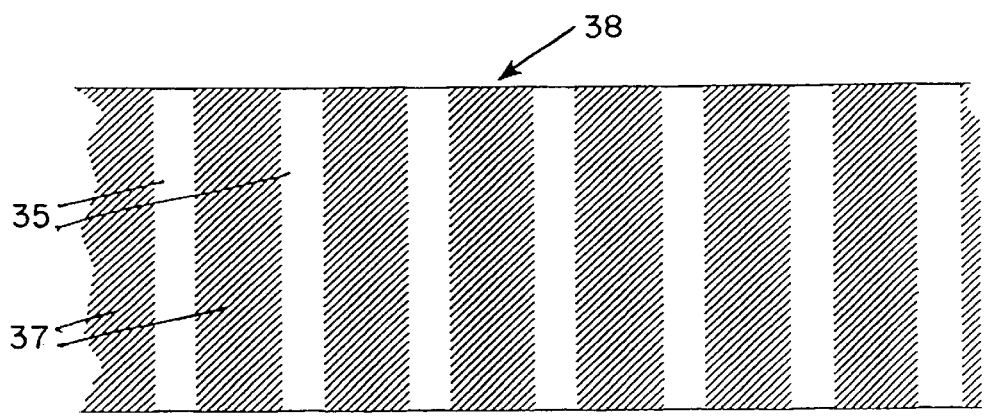
FIGS. 9 and 10 are diagrammatic views of an encoder pattern for the reticle and mask elements of the optical sensor of the present invention, showing a modification for detecting direction of relative movement of the reticle and mask by means of quadrature.
Figure 10:
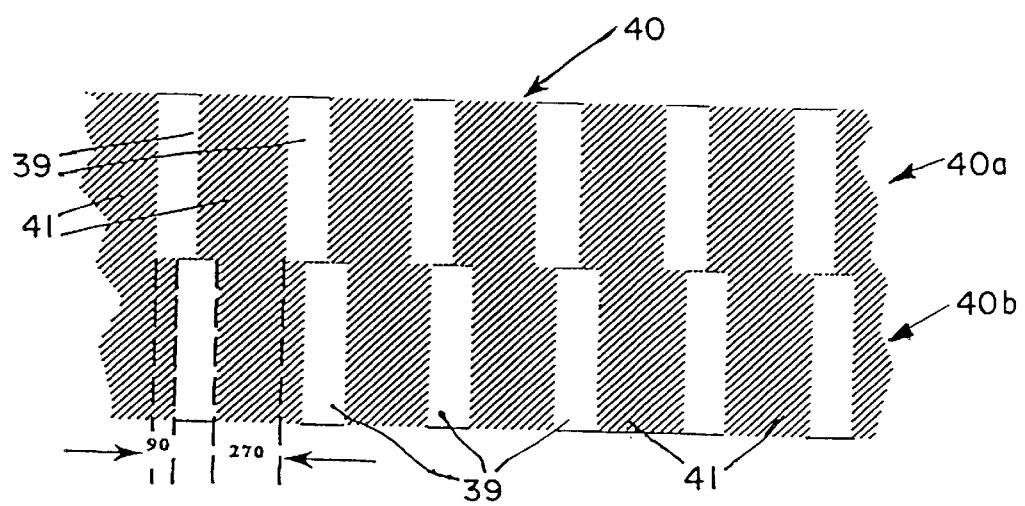

Referring to FIGS. 9 and 10, there is shown a first modified grid design of the present invention, wherein the transmission grid, or reticle, generally indicated by the reference numeral 38, is identical to the grid design of FIG. 6, while the reflective grid, or mask, generally indicated by the reference numeral 40, has two identical portions, generally indicated by the reference numerals 40a and 40b, as shown in FIG. 10. The reticle 38 has active, or light pervious areas 35 and passive, or light impervious areas 37. Each portion 40a and 40b of the mask 40 has active, or reflective areas 39 and passive, or non-reflective areas 41. The non-reflective areas 41 are twice as wide as the reflective areas 39. The second portion 40b is offset from the first portion 40a by half the distance of the width of an active area along the longitudinal axis of the mask. In this embodiment, two optical fibers are employed as shown in FIG. 2. One optical fiber is aligned with the portion 40a and the other optical fiber is aligned with the portion 40b. Each optical fiber has an end surface which is parallel to the plane of the mask 40 for directing a pulse of light transversely of the active surfaces of the reticle and the mask. Directionality of the relative movement between the elements of the structure being monitored is resolved by quadrature as provided by the offsetting of the offset portions 40a and 40b. The variability in light directionality which is encountered in actual practice may require slight modification in the 2:1 ratio to produce the equal 'on' and 'off' condition.

Figure 11:
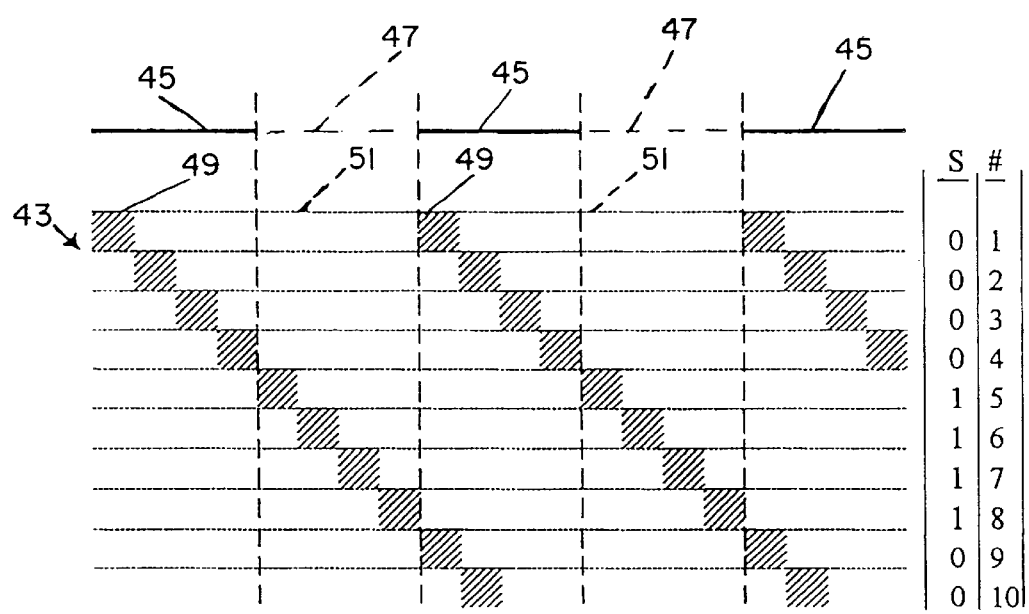
FIGS. 11 and 13 are diagrammatic views of a further modified encoder pattern for reticle and mask of the optical sensor of the present invention.
Figure 12:
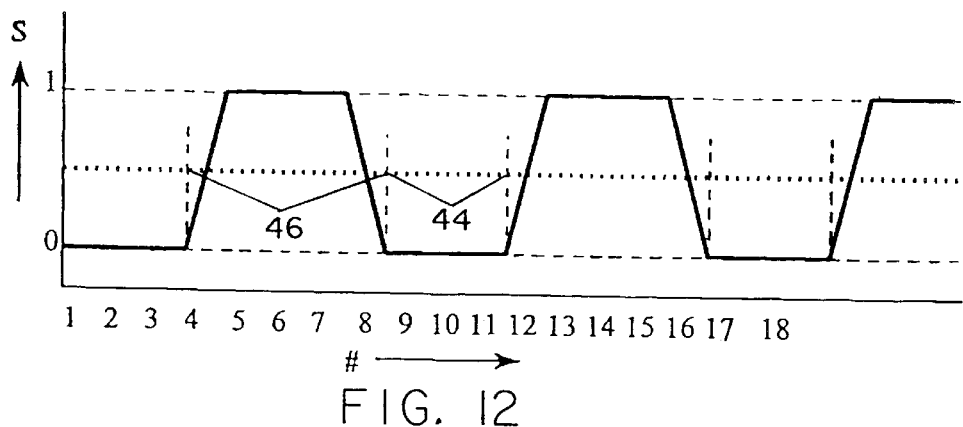
FIGS. 12 and 14 are charts showing the optical power pattern resulting from the relative displacement of the reticle and mask of the optical sensor plotted against reflected light intensity for the encoder pattern of FIGS. 11 and 13 respectively.
Figure 13:
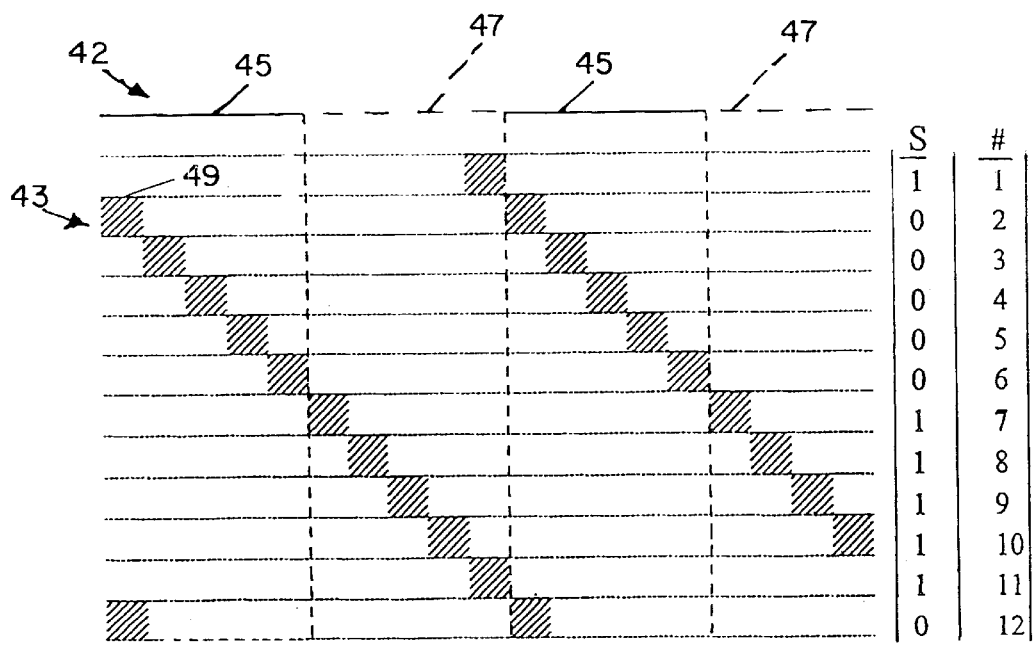

Referring to FIGS. 11–13, there is shown another modification of the encoder geometry of the present invention, generally indicated by the reference numeral 48. In the sensor geometry 48, the reticle and the mask do not employ the same active area to passive area ratios.

The sensor geometry 48 includes a transmissive grid, or reticle 42 and a reflective grid, or mask 43. The reticle 42 has a plurality of uniformly spaced light impervious surfaces 45 which are the passive areas of the reticle. The areas between the surfaces 45, indicated by the reference numeral 47, are light pervious and are the active areas of the reticle. The widths of the active and passive areas of the reticle 42 along the first, or central longitudinal axis of the sensor, is one-to-one. That is, the width of each light impervious surface 45 is equal in width to each light pervious area 47 along the first axis. The mask 43 has a plurality of uniform, equally spaced reflective surfaces 49. The areas between the reflective surfaces 49, indicated by the reference numeral 51, are non-reflective and represent the passive areas of the mask 43. Reflective surfaces 49 represent the active areas of the reflective mask 43. The width of each passive area 51 is substantially larger than the width of each active area 49 along the first axis, or longitudinal axis of the sensor.

Figure 14:
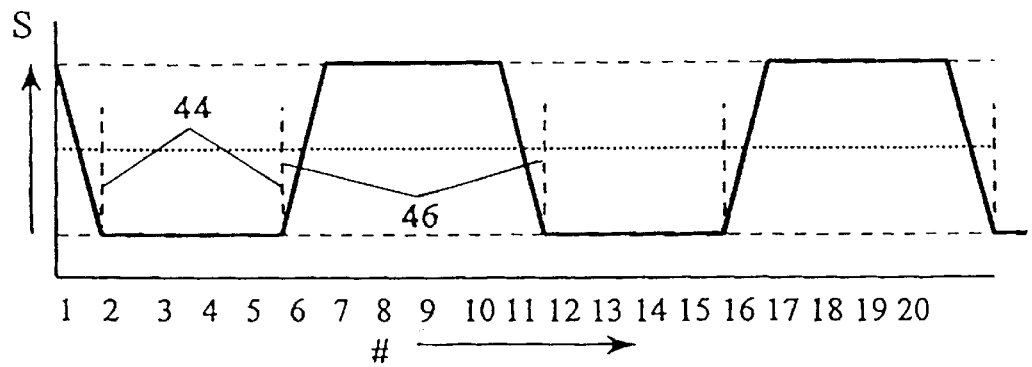

It has been found that threshold triggering will yield an approximation of the 1:1 digital switching with either 4:1 or 5:1 reticle:mask active area ratios, see FIGS. 11 and 13. The corresponding signal threshold switching outputs are depicted in FIGS. 12 and 14, respectively. The lateral mask 43, motion relative to the fixed reticle 42, in FIG. 11 is shown as a descending sequence of zeros and ones against the sequential number on the right hand side of FIG. 11. The reflective ratio in FIG. 11 is 4:1 and a 5:1 ratio is shown in FIG. 13. The higher ratio will more closely approach the desired signal equality at threshold switching, but at the expense of reflective active area and concomitant reflected signal strength. It is apparent from FIGS. 12 and 14 that the 'logical one' periods resulting from threshold triggering 44 are longer than the 'logical zero' periods 46, FIGS. 12 and 14.

Figure 15:
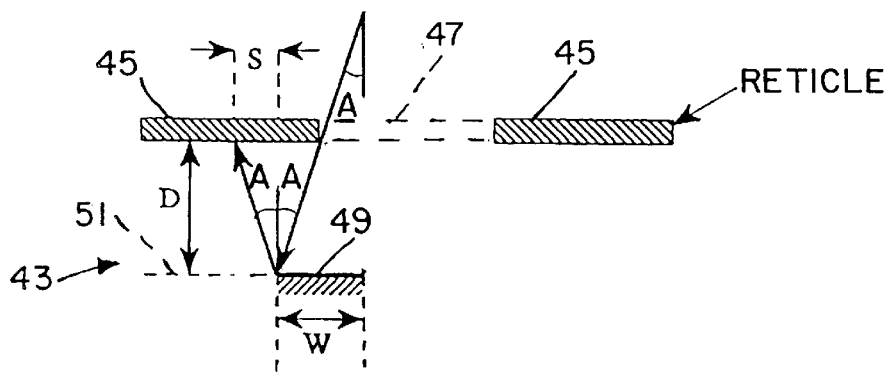
FIGS. 15, 16 and 17 are diagrammatic views of a further refinement of the modified encoder patterns of FIGS. 11 and 13 which permits deliberate alteration of the optical power patterns of FIGS. 12 and 14.
Figure 16:
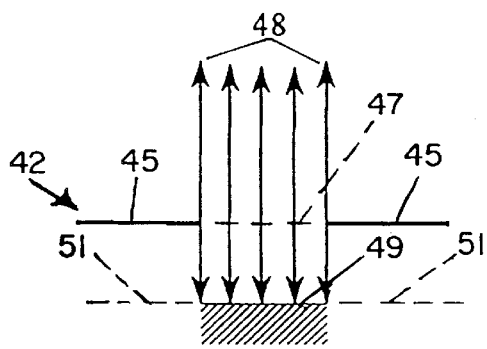
Figure 17:
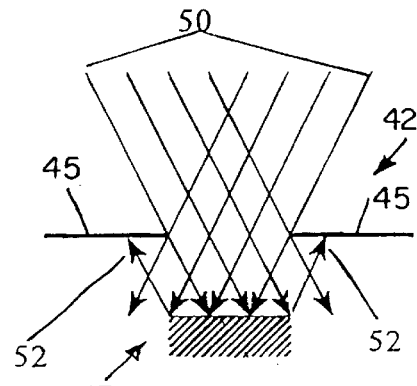

This analysis was conducted under the assumption that the reticle-impinging light is orthogonal to the structure 48, FIG. 16. However, in actuality this is not the case. The light will emerge from the optical fiber at a range of angles, typically up to 25 degrees or so to the vertical 50, as shown in FIG. 16. This results in a decrease in the effective area of the reflector patches, thus effectively reducing the on cycle, and evening up the intervals between "logical ones" and "logical zeros" for the desire threshold switching protocol. This is illustrated as light rays 52, FIGS. 16 and 17 mathematically in FIG. 15. The precise relationship for the anticipated signal shift and the angle of light impingement is also given in FIG. 15.

FIG. 15 illustrates a 1:1 switching with an asymetrical mask within a=Mean Angle of Incident Light and D=Distance from Reticle to mirror. When the reflective width W of the mirror is infinitely small, the threshold switching is 50:50.

Therefore, when the shadowed width, 'S' is equal to 0.5 W, then the effective reduction in W from both ends will have the effect of making 'W' infinitely small.

This occurs when S=D.tan(a) and W=2S, so that: W=2D.tan(a) for 1:1 switching.

Thus, the true value of this approach is that a set threshold signal strength for switching can be established for a particular mask/reticle ratio, based on the system-imposed variables of an optical fibers Numerical Aperture and the specifics of the detector system. Once, set, however, further variations in the specific fiber signal strength will not have any effect on the switching ratios.

Figure 18:
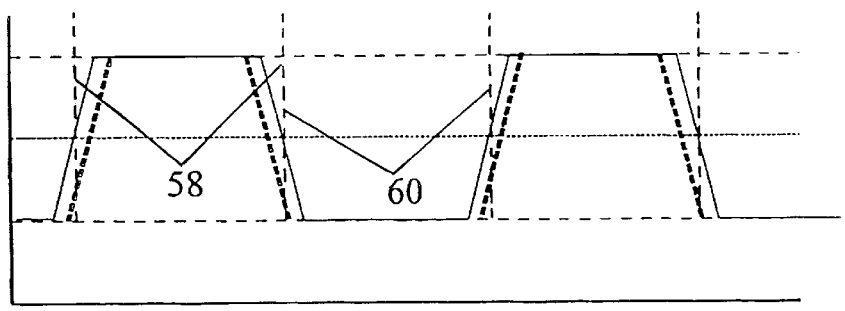
FIG. 18 is a chart showing the relative displacement of the reticle and mask of the refinement of the modified encoder patterns of FIGS. 15–17.

The change in the threshold signal level switching is shown in FIG. 18, where the original orthogonal light-derived signal is narrowed to the dashed signal profile so that the threshold 'one' internal 58 is equal to the threshold 'zero' interval 60.

Figure 19:
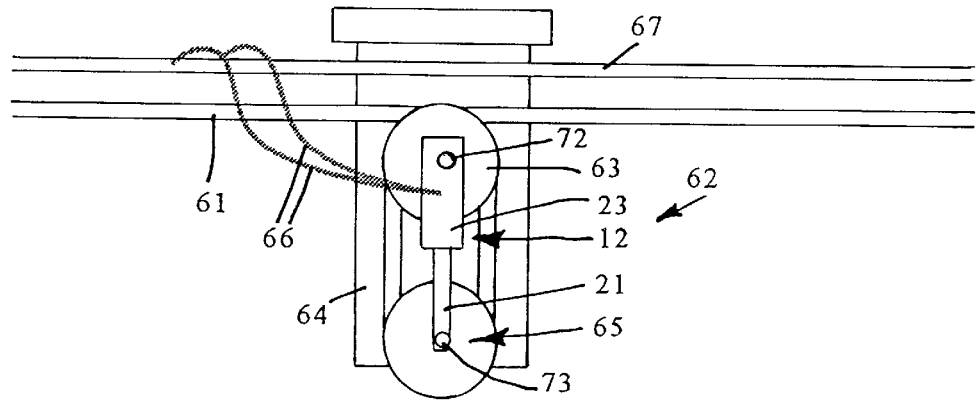
FIG. 19 is a front elevational view of a tensioner/sensor assembly for monitoring a structure.
Figure 19A:
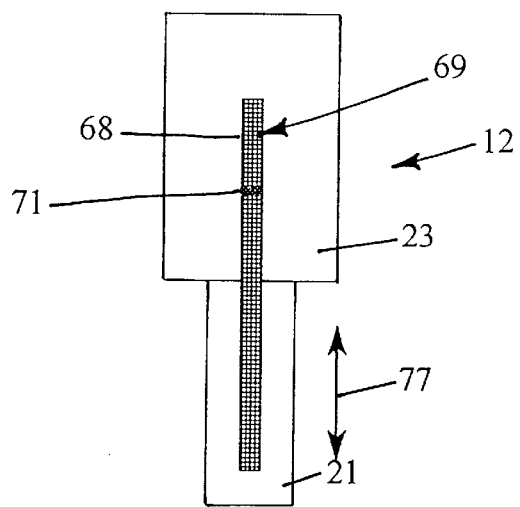
FIG. 19A is a diagrammatic view of the sensor portion of the tensioner/sensor assembly of FIG. 19.

Referring to FIGS. 19 and 19A, there is shown a tensioner/sensor assembly, generally indicated by the reference numeral 62 for a drone cable 61. The assembly 62 includes an optical sensor 12 and a fixed pulley 63 which is fixed rotatably mounted on an axle 72 which is fixed to a mounting bracket 64 attached to a bridge deck or other structure to be monitored. The housing portion 23 of the sensor is also mounted on the angle 72. The probe portion 21 of the sensor 12 is rotatably mounted on an angle 73. One end of the axle 73 is fixed to a floating pulley 65. The other end of the axle 73 extends into a vertical slot in the mounting bracket 64 for guiding the axle 73 as the floating pulley 65 moves toward and away from the housing portion 23 of the sensor 12 as indicated by the double headed arrow 77 in FIG. 19A. The probe portion 21 of the optical sensor 12 is fixed outwardly by an internal spring in the housing portion 23 of the sensor. The outwardly biasing sensor 12 is used in the examples of the present application. However, in some applications of the invention, an inwardly biased sensor may be used or a sensor which does not have a bias. The drone cable 61 is wrapped at least once around the pulleys 63 and 65. An optical fiber 66 or fibers 66 extend from the optical fiber cable 67 which is deployed next to the drone cable 61.

The floating pulley 65 is compelled by the internally-sprung encoder to move away from the fixed pulley 63 to accommodate any slack in the drone cable 61.

Any such movement is registered by the digital mask in the encoder via the interrogating optical fibers.

In the event that larger cable length changes are anticipated than can be accommodated by the travel of the encoder, multiple pulley sheaves can be employed to demagnify the cable's travel. Any such adjustment would be readily compensated for in the computer software.

The optical sensor is preferably enclosed in a protective box or the equivalent in order to safeguard the sensor from environmental hazards.

The Encoder body is internally spring loaded to the maximum extension possible. Referring to FIG. 19A, certain movement-induced compressive forces will overcome the spring loading and cause the reticle Quadrature strip 68 to translate past the mask strip 69 and the interrogating optical fiber connector at point 71 whose entrained fiber will be emitting a constant high bit-rate stream of pulses. This output will be reflected back into the same fiber for the return trip to the detector so along as the openings of the reticle strip 68 coincide with the reflective strips of the mask strips 69.

DRONE CABLE SUPPORT SYSTEM

One of the prime features of the distributed fiber cable sensor system has been its dual function as both the conduit for the sensor conductors and the actuator for sensor movement via strategic sensor placement. In some instances where extreme distances exist between the two interrogation anchors, in span deflection measurement for example, there may be problems of accumulated cable weight. Here, we are referring to the catenary effect of a cable stretched between two mutually distant points. Any change in separation between those points should translate directly into an equivalent change in the interposed encoder sensor. When the fiber cable is deployed over long distances, there is the risk that the cables own tendency to catenary under its own weight will nullify its ability to react to the extrinsic actuating agent, in this example the downward deflection of a bridge deck under load. The obvious palliative is to create an overwhelming tensile stress on the cable through imposition of a massive expansion spring in the cable. However, a vicious circle is created where the cable must be bulked up to survive these tensile forces which only makes the cable heavier and more prone to sagging under its own weight, raising the prospect of further strengthening and concomitant weight increase. In order to avoid this circular problem, a scheme has been derived which side-steps this problem.

THE DRONE CABLE SOLUTION

Many embodiments of the distributed cable system of the present invention employ the fiber cable and drone cable for the monitored structural segment. The goal of this improvement is to show that the basic principal of the system may be preserved while adding a series of application-specific distance-registering around fiber drone cables whose only function is to accurately and swiftly follow the relevant distance changes.

Figure 21:
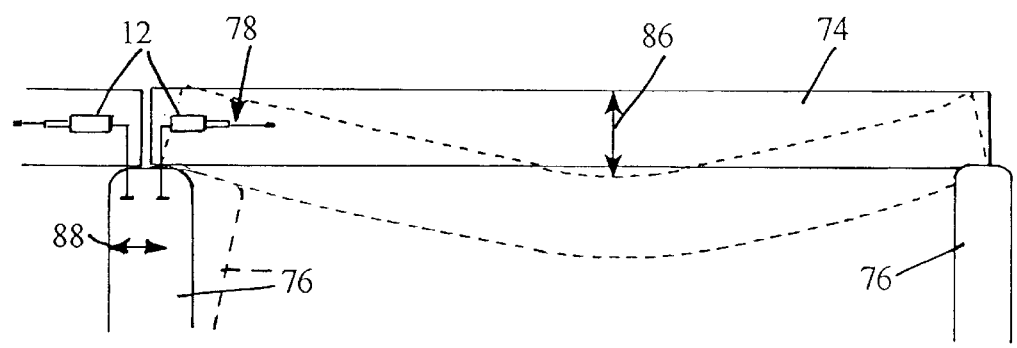
FIG. 21 is a diagrammatic view illustrating a combination deck deflection and pier tilt monitoring system with the use of sensors.

As shown in FIGS. 19 and 19A, tensioned drone cable is wrapped at least once around the two pulley assemblage which comprises the tensioner portion of the optical sensor. The floating pulley is compelled by the internal spring of the sensor to move away from the fixed pulley to accommodate any slack in the drone cables caused by movement of the monitored bridge section. Any such movement is registered by the digital mask in the sensor via the interrogating optical fibers. This way, otherwise separately supported and deployed optical fiber cable enjoys the ability to vicariously monitor the drone cable's movement without the onus of having to sustain the inter-anchor span stresses. FIG. 21 shows the system monitoring for bridge deck deflection. Here, the fiber cable monitors the drone cable's movement due to the deflection of deck-attached deflectors, which exaggerate the bridge deck motion and thus the drone cable motion, encoder translation, and optical signal transmission.

DECK DEFLECTION AND PIER TILT MONITORING

Figure 20:
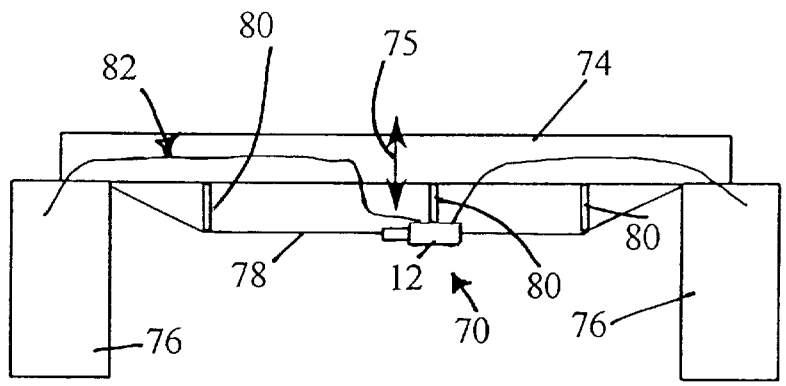
FIG. 20 is diagrammatic view of a sensor as applied to a bridge for monitoring deflection.
Figure 20A:
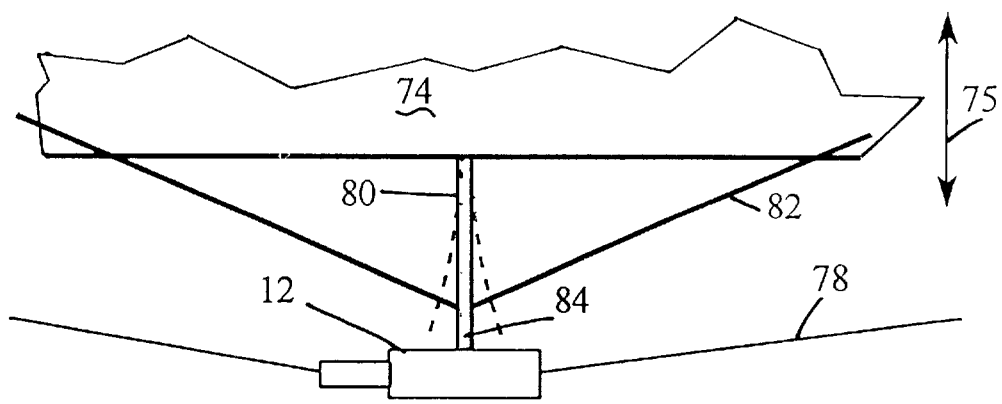
FIG. 20A is an enlarged view.

Referring to FIGS. 20 and 20A, the bridge deck deflection and pier tilt monitoring system of the present invention is generally indicated by the reference numeral 70. The system 70 includes an optical sensor 12 applied to the bridge deck 74 which is supported between a pair of piers 76. The bridge deck motion to be detected is indicated by the arrows 75. A drone cable 78 is located below the bridge deck 74 and extends between the piers 76. Drone cable deflectors 80 are fixed to the underside of the bridge deck 74 for maintaining the drone cable 78 spaced from the underside of the bridge deck. The optical sensor 12 is operatively connected by the drone cable 78 and is supported from the underside of the bridge deck 74 by one of the deflectors 80, see FIG. 20 in particular. An optical fiber cable 82 is loosely supported on the bridge deck 74 and is attached to the deflector 80. An optical fiber 84 is broken out from the fiber cable 82 and is operatively connected to the optical sensor. The drone cable 78 is preferably made of an aramid fiber such as Kevlar®. The advantage of using aramid fiber cable as a censoring component is that it is very flexible but inextensible and has virtually zero thermal expansion. Further, it is extremely strong and hazard-resistant, particularly when sheathed by an environmentally-protective outer jacket, and is also light in weight. Thus, it lends itself perfectly to deployment as a remote sensing component on bridges and large structures alike. This modification in no way detracts from the original premise of the distributed structural monitoring system. Indeed, it extends the application of it through the use of application-specific drone cables whose sole task is to create the conditions for an otherwise environment-isolated fiber cable to address in its conventional and intended fashion.

It will permit the monitoring of many fiber cable-hazardous environments by deploying the appropriate drone cables between the hazardous locations and the fiber cable-benign sensing area. Obvious examples include high and low temperature, chemicals, nuclear radiation, under water, and many more. Applications that use the drone cables include deck deflection and pier tilt sensing, pier scour detection, pile movement monitoring, wind velocity determination, pothole detection and traffic monitoring, and building movement and fire detection.

As shown in FIGS. 20 and 20A, the drone cable 78 is artificially held away from the underside of the bridge deck 74 under consideration by one or more of the deflectors. These are interposed between the deck's lower surface and the drone cable 78 to obviate friction and its attendant abrasion, and also to artificially create a space for sensor deployment. It is possible, although not mandatory, for the deflectors to offer enough lateral flexibility to accommodate the sideways vector motion of the drone cable, the natural outcome of the deck's up-and-down motion, without the need for slidable means between the deflectors and the drone cable which would be otherwise necessary.

The lateral movement of a deflector whose base is fixed to the drone cable offers an alternative or even additional site for the location of a fiber cable and encoder sensor. In this instance, the drone cable could merely perform the inevitable task of accommodating the stretching and shortening effects on the drone cable of the deck's downward and upward movements.

As the deflector 80 flexes laterally under the impetus of the deck's vertical motion, the optical fiber cable 78 anchored to the deflector will respond and actuate the associated sensor.

FIG. 21 shows a combination deck deflection—pier tilt monitor. For simplicity, the fiber cable (which would run along the length of the bridge deck) and optical fibers leading to the encoders are not shown. Bridge deck deflection is indicated by arrow 86 and pier tilt is indicated by arrow 88.

Any movement within the sensor 12 of the bridge deck 74 or piers 76 would cause a change in Drone cable length, encoder movement within the sensor 12, and thus optical fiber signal transmission. And with movement sensing up to 60 cm, abnormal deck deflection and pier tilt could be detected and possible structural damage and catastrophic failure averted.

Pier tilting can also be monitored by deploying a tiltmeter on the pier. A tiltmeter is a device for detecting and measuring any change in angular attitude of a member to which the tiltmeter is attached, Referring to FIGS. 22A and 22B, an encoder-based tiltmeter of the present invention is generally indicated by the reference numeral 54. Tilt meter 54 includes an encoder wheel 55 rotatably mounted on a shaft 81 which is fixed to a housing 79. The wheel 55 has a mask with a radial encoder pattern and is disposed to a set position by means of a weight 57 attached to its extremity in such a way so as not to interfere with the encoder wheel rotation within the housing 79. A reticle which corresponds to the encoder wheel's mask is attached to the tiltmeter housing 79. The tiltmeter 54 includes means for interrogating the relative translation of the mask and the reticle. Such means may be a conventional LED-photo diode pair, as employed in conventional electro optic encoders, or else optical fibers in either reflective or transmissive deployment geometries.

The mask and reticle layouts may be conventional or else according to that which has been described in connection with FIGS. 6–18. In the preferred embodiment on interrogating optical fiber 83 is located on a mounting bracket 85 which is fixed to the housing 79.

FUNCTION

The tiltmeter housing 79 is firmly attached to a relevant portion of the structure whose incipient change in angular disposition would be of importance. The interrogating electro optic or optical system will register the initial status through recording the relative locations of the reticle and mask. Upon a change in structure angularity, the housing will tilt, taking with it the reticle assembly. The encoder wheel with its mask will not change angularity, however, due to the weight attached to its lower extremity and acted upon solely by gravity. The resulting relative displacements of the reticle and mask will therefore quantifyably indicate the angular change in structural status.

BRIDGE PIER SCOUR DETECTION

It has long been known that one of the principal reasons for bridge collapse is scour, the erosion of the substrata beneath river-spanning bridge support piers. Monitoring this has prove to be so difficult that current protocol calls for suspect bridges to be visually examined every five years using frogmen to inspect the submerged portion of such piers. It is our proposition that the distributed fiber and drone cable system of the present invention can be configured such that even small movements arising from the leaning of a compromised pier can be detected and isolated early enough in the process that compensatory actions may be taken before the structure reaches the point of catastrophic failure.

INFERENTIAL MEASUREMENTS

The encoder sensor can be calibrated to monitor movements as small as five microns, or one-third of the width of human hair. By intelligently deploying a series of distributed sensors, the system is able conceptually to detect minute relative movement shifts of the various bridge components.

The principal here is simple: the first structural effect of scouring, which is the washing away of supporting strata beneath bridge piers, is the movement of those piers in response. When this movement occurs, it causes the vertically deployed drone cables to change length. These changes are readily accommodated through sensor motion to detect such movement and to report it.

It should be pointed out also that the optical sensors which are located to span every critical member junction will monitor any localized movements, and will also almost certainly detect sympathetic movements. All of these inputs will be available to the computer data base in real time and accessible for correspondingly real time analysis and manipulation.

This illustrates that a major strength of the present system, i.e., is its ability to gather many often disparate data allowing them to be cross-correlated instantaneously.

DIRECT MEASUREMENTS

While the foregoing describes the detection of an underwater problem through above wage monitoring, there is a strong argument for a more direct approach whereby the fiber cable system itself is deployed in the locality of suspected scour. Here, however, the logistics and necessary characteristics of the fiber cable system are rather different from the standard deployment addressed to date. In the first place, there is the questions of cable tie-off placement especially in the context of the tangible drag and disturbance of water flow and possible ice formation. Both of these agents could easily disrupt the system and cause it to broadcast phantom alerts. The location and nature of the suspected problem areas must first be determined. The problem areas will most likely involve the erosion of pier foundations, often where remedial actions are either contemplated, under installation, or else already in place. Any one of these three scenarios will permit an interactive design opportunity because the most critical erosion candidate areas will have already been identified. It will be necessary to have been appraised by the experts of critical parameters such as the location, the allowed erosion depth, the allowed sub-pier incursion distance, etc. This information will offer crucial knowledge of where and what to sense.

Small movement monitoring in an unpredictable and hostile environment, submerged in a potentially fast-flowing and foreign body-laden stream of water is the challenge. The sensing system must be isolated as far as possible from the spurious effects of the environment.

Figure 22:
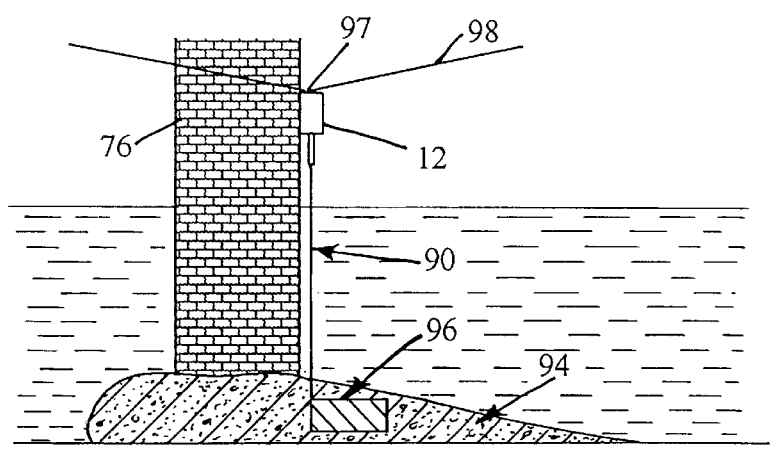
FIG. 22 is a diagrammatic view illustrating a sensor system for detecting scour at the base of a bridge pier.
Figure 22A:
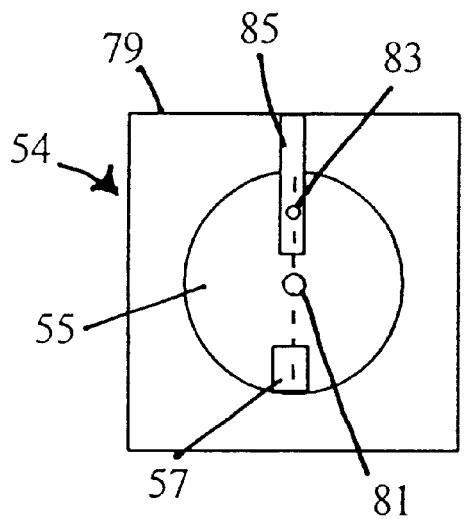
FIGS. 22A and 22B are diagrammatic illustrations of a tilt meter employing the principles of the present invention.
Figure 22B:
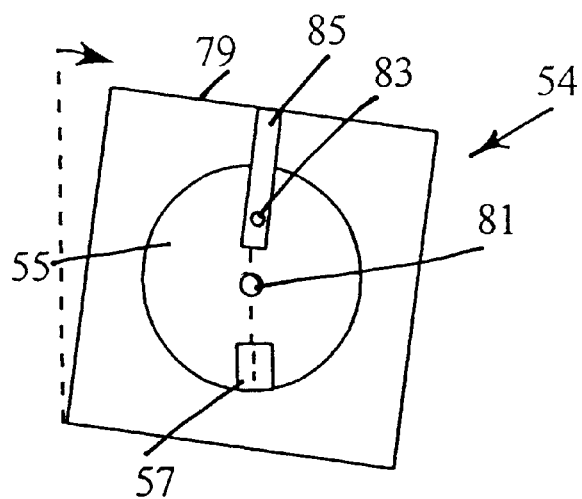

Referring to FIG. 22, the placement of the sensor will devolve from the experts' analyses, and will preferably have the form of under-water aramid fiber drone cable extensions. The sensors are sheathed within a rugged protective conduit to protect the sensors from floating detritus or even legitimate maritime traffic which could equally disrupt the detection system's integrity. The upper end of a drone cable 90 is attached to an optical sensor 12 at some point above the water on the bridge pier 76. After descending underwater, the cables will follow the length of the bridge pier to the floor 94 of the waterway. Here, the cable 90 is tied off to a weighted concrete block 96 that rests on the waterway floor. When the motion of the underlying substrata is large enough to move the concrete blocks, the corresponding drone cable and encoder movements will lead to signal changes in the interrogating optical fibers 97 from the optical fiber cable 98. Thus, both the occurrence and location of substrata erosion will be detected by the system. With the integrity of the bridge structure continuously monitored, sudden, drastic changes, in the stability of the substrata, such as during or after a major flood, can be evaluated, and if the pier scour damage is deemed severe, alarms can be posted and bridge authorities notified immediately.

The approach described above addresses the placement of the sensors above the water level but attached via drone cables to the submerged sites. Further, it creates a hybrid analog-digital sensing modality where real trouble is indicated by the gross movement associated with a concrete block whose large movements will indicate the erosion of a section of river bed, but with the expectation that smaller detected precursor motions will most likely forecast the digital catastrophic sensor failure. It also addresses the hostile environment through keeping all fiber optical components above the water in the more controlled environment, but placing only rugged cable and concrete blocks, effectively, under the water.

Bridge pier scour, which is the erosion of the substrata beneath waterway-spanning support piers, is recognized as one of the principal reasons for bridge collapse. Thus, methods of averting pier scour disasters by strengthening the pier structure with deep foundation attachments have been the subject of much recent research. These deep foundation elements are known as piles (or micropiles when they are small diameter structures), and they have been used typically as a load transfer connection from the bottom of the bridge pier to competent subsurface strata. Piles have also been used in other water-spanning and landed structures alike, particularly micropiles, which have been used to strengthen historic buildings across the world. But like bridge pier scour detection, monitoring these structures has proven difficult since the piles may extend well below the floor of the waterway grand surface. It is our proposition that the fiber cable system of the present invention can be configured such that even small movements of the piles can be detected and isolated early enough in the process before the onset of erosion, loosening of the piles from the stable substrata, and possible catastrophic failure of the piles and/or the supported structure.

Figure 23:
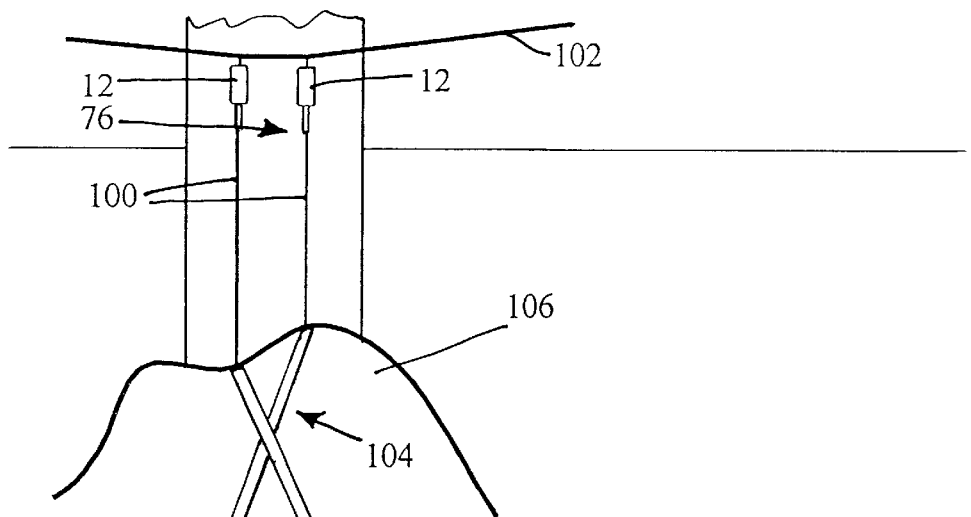
FIG. 23 is a diagrammatic view of a modified monitoring system for detecting scour at the pier portion of a bridge.

The first structural effect of scouring on bridge piers is the movement of those piers in response to the now unstable adjacent substrata. Similarly, as the soil moves or begins to erode around the pile, it too will move in response, and abnormally large translations will indicate the overall loosening of the pile from the stable substrata, and thus the imminent likelihood that pile failure would occur. Referring to FIG. 23, for each bridge pier 76, vertically deployed, environmentally protected drone cables 100 are attached to optical sensors 12 at the top of the pier 76. While the sensors 12 and the interrogating optical fiber sensor cable 102 would remain well above the water, only the protected sheathed drone cables enter the potentially hazardous environment. As the drone cables 100 descend below the pile cap, they are looped around the top of the piles 104 in the river bed 106, each drone securely attached to a pile or a group of piles. Since they, like the other drones, are made of movement-sensitive arramed material, the slightest movements of the piles would be transmitted by the drones to the attached encoder sensors. the change in the incoming signal by the encoder would then be readily perceived by the outgoing fiber path, which would report such data immediately. All of these inputs will be available to the computer data base in real time and accessible for correspondingly real time analysis and manipulation.

This illustrated a major strength of the technique of the present invention, its ability to gather many often disparate data allowing them to be cross-correlated instantaneously. Thus, the entire pile system could be monitored full-time. And with a movement resolution as small as five microns, the state of the piles can be tracked and possible failure predicted, whether attached to bridge piers, oil rigs, historic buildings, or other structures with foundation support systems.

BRIDGE TEMPERATURE SENSOR SYSTEM

Figure 24:
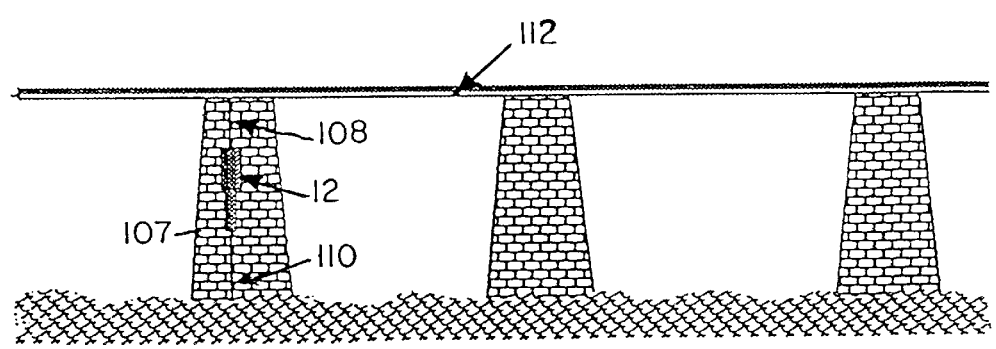
FIG. 24 is a diagrammatic view of an application of the monitoring system of the present invention for monitoring bridge temperature.

Referring to FIG. 24, an optical sensor 12 is tensioned between a zero-expansion fiber optical jumper cable 108 and a known thermal expansion calibrated rod 110 attached to a substantial portion of the bridge, such as a pier 107, away from direct sunlight.

The calibrated rod expands and contracts with the changes in temperature and causes the optical sensor 12 to accommodate any length changes resulting therefrom. The fiber cable jumper 108 (i.e. the interrogating optical fibers) carries the displacement information back to the trunk cable 112 and thence to the modem.

WIND VELOCITY SENSOR SYSTEM

Figure 25:
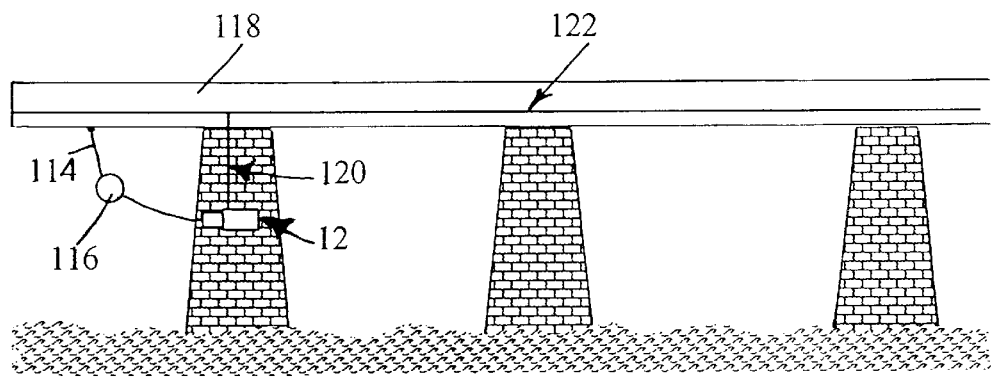
FIG. 25 is a diagrammatic view of a monitoring system of the present invention for monitoring wind velocity.

Referring to FIG. 25, an arramed cable 114 is attached to a wind-sensitive sensor or material 116, and is strung from the bottom of the bridge deck 118 to the pier wall, where the cable is connected to an optical sensor 12. Wind speed and direction changes will cause the drone cable to move in response, and such changes are recorded instantaneously in the interrogating pulse signal which is carried back to the modem via the fiber cable jumper 120 and the trunk optical cable 122.

POTHOLE DETECTION AND TRAFFIC FLOW MONITORING

Figure 26:
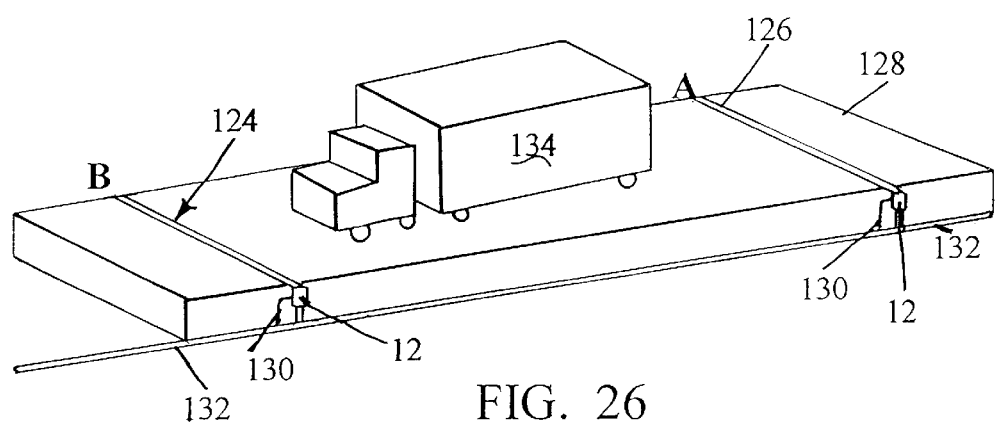
FIG. 26 is a diagrammatic view of a monitoring system of the present invention for detecting potholes in the deck portion of a bridge.

Referring to FIG. 26, two drone cables 124 and 126 are stretched across the bridge deck surface 128 a set distance apart. They are each attached to a dedicated optical sensor 12 hooked into the fiber optic interrogation harness. Each optical sensor 12 is connected to an optical fiber 130 from a trunk cable 132 which is part of the fiber optic interrogation harness. Thus, any vehicle 134 passing over the deck will trigger a response in the two sensors 12 which will transmit the information back to the modem. Alternatively, sensors placed at each end of a deck section to monitor deck motion and vibration will be actuated by the passage of proximal traffic. In FIG. 27A, the sensors 12 are positioned at seams and 52 in the bridge deck. A pothole to be detected is indicated at TP at the surface 128 in the span 127. A vehicle passing over the seams S1 and S2 will trigger a response in the two sensors 12.

When potholes appear in the roadbed, exaggerated pounding will accrue to the deck which will both eventually cause damage and, more immediately, cause the deck vibration sensors to see large amplitude excursions than would be expected with a pothole-free roadbed for the same vehicle conditions. The problem has always been to know the type and velocity of the vehicles involved with pothole interactions in order to quantify the vibrational effect.

With a full-time monitoring system there is a way to do this just as long as there is sometime during the twenty-four period when only a solitary vehicle is passing over the bridge. Better yet, the results would be far more indicative if the vehicle type and velocity were known.

Using the real-time monitoring capability of the present system and the appropriate computer algorithm, the computer will recognize a solitary vehicle, compute its velocity from both the time taken from point A to Point B and the time dwell of the tires on the drone cables, and recognize a tractor trailer, for example, from its distinctive wheel sequence signature. When the solitary tractor trailer conditions are recognized, the computer will record the deck vibration amplitude data and normalize them for the measured A-to-B velocity. These data will be stored and continuously trend-analyzed to see if some extrinsic factor, such as a pothole, or even ice build-up, is causing an anomalously large vibrational deck affect. The pothole sensing algorithm is illustrated in FIG. 27B.

TRAFFIC FLOW MONITORING

Figure 27:
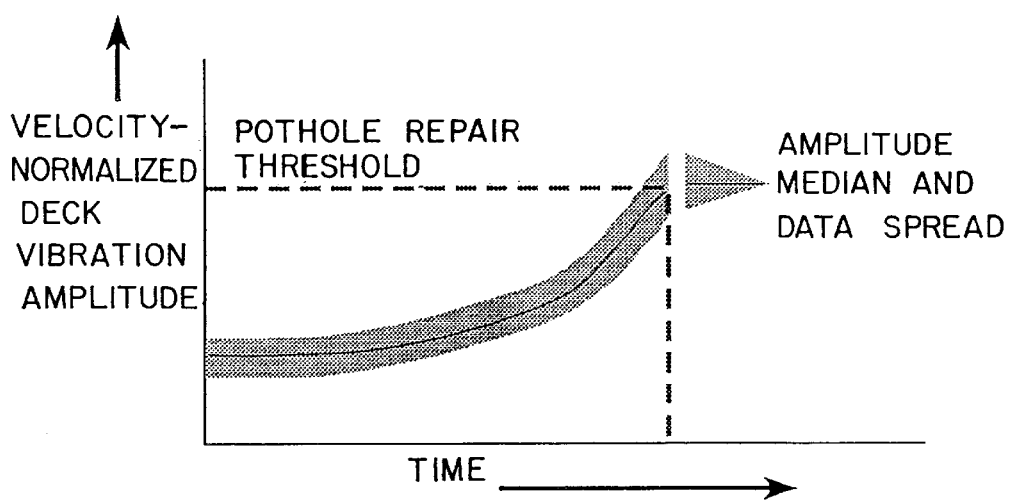
FIG. 27 is a graph illustrating the application of the pothole detection system of FIG. 26 for determining a repair threshold value.
Figure 27A:
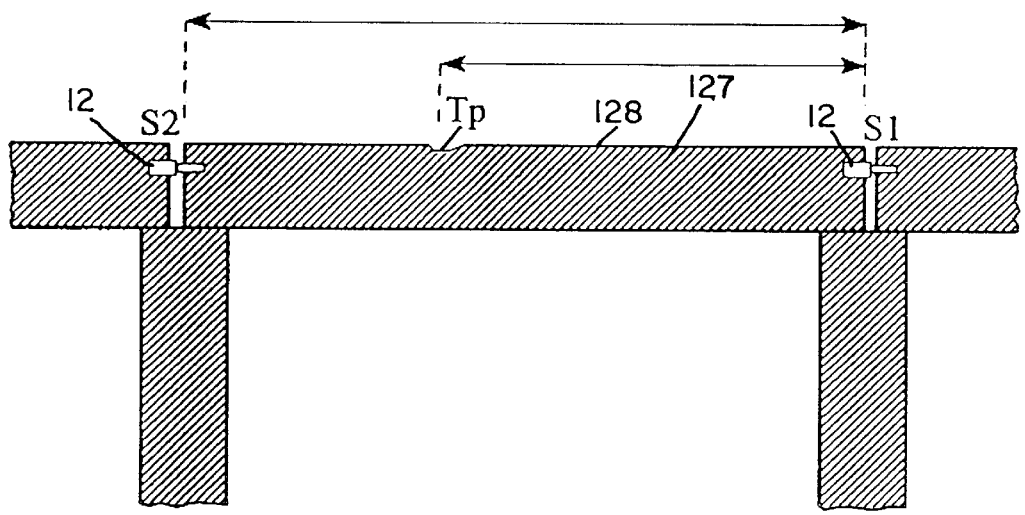
FIG. 27A is a diagrammatic view of a modified application of the pothole detection system of FIG. 26.
Figure 27B:
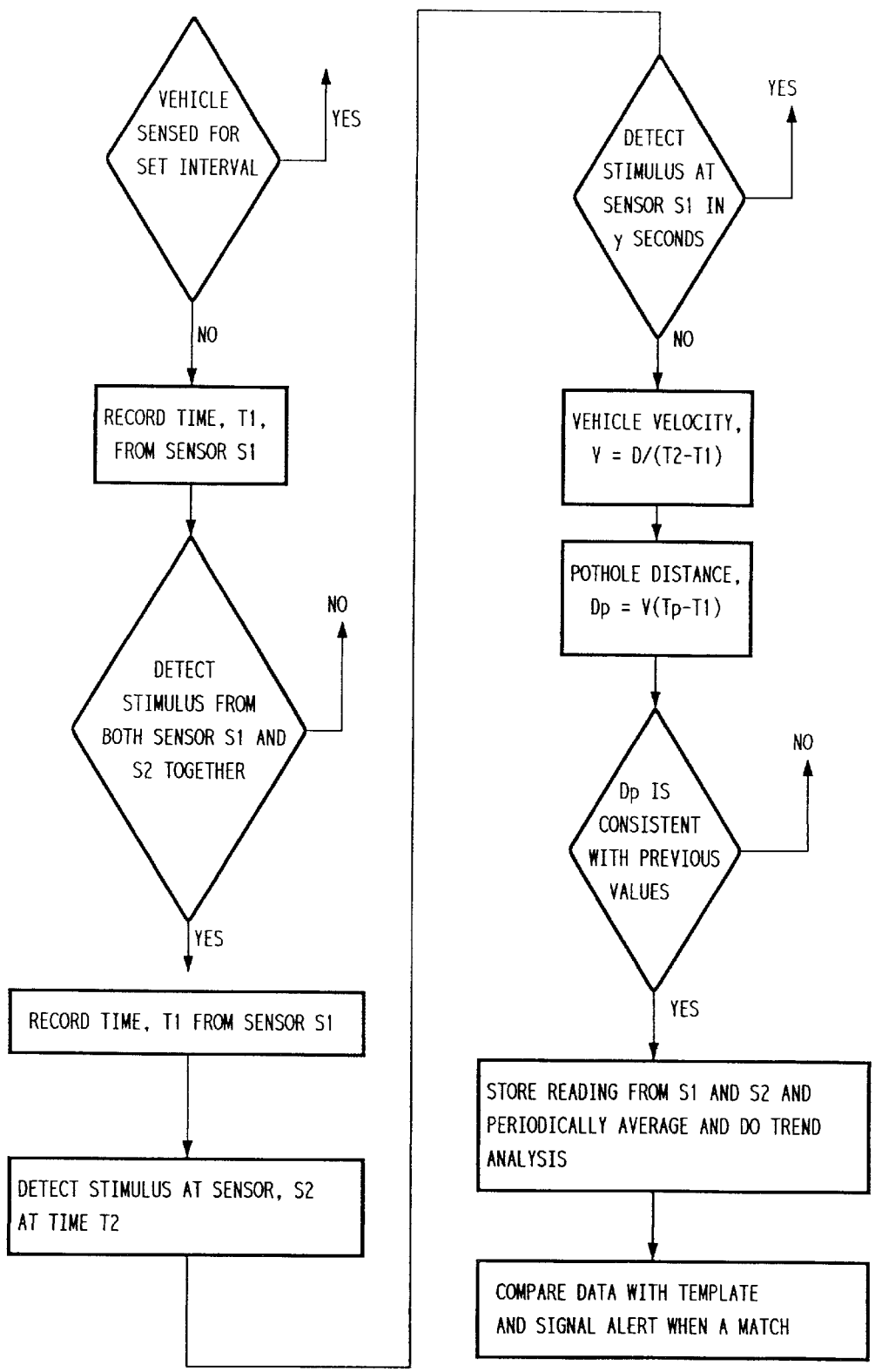
FIG. 27B is a flow chart of the pothole sensing algorithm for the pothole monitoring systems of FIGS. 26 and 27A.

As illustrated in FIG. 27, a solitary vehicle's velocity can be determined from both the time taken from point A to point B and the time dwell of the tires on the drone cables. If traffic flow is light, then single vehicles traveling over a bridge or a certain segment will be more common, and their speeds thus computed with ease, so long as the distinctive wheel sequence signature is recognized. If, however, traffic is congested or even at a standstill on the bridge, the great amount of time that tires spend on the drone cables (since they will be moving at zero or near-zero velocity in heavy traffic) will be translated instantaneously through the optical sensor 12, with the new displacement information carried back to the modem via the fiber cable. Thus, as soon as traffic jams start to form on a monitored bridge or another installed section of roadway, TV and radio station traffic patrols can be notified immediately, and the general public alerted to these traffic problems sooner than with modern on-site helicopter monitoring practices.

CORROSION MONITORING

The system of the present invention integrates all factors leading to rebar corrosion by placing a sacrificial rod in contact with the concrete matrix under investigation and exploits two distinct aspects of this controlled corrosion.

ROD INCREASE SEQUENCE

Figure 30:
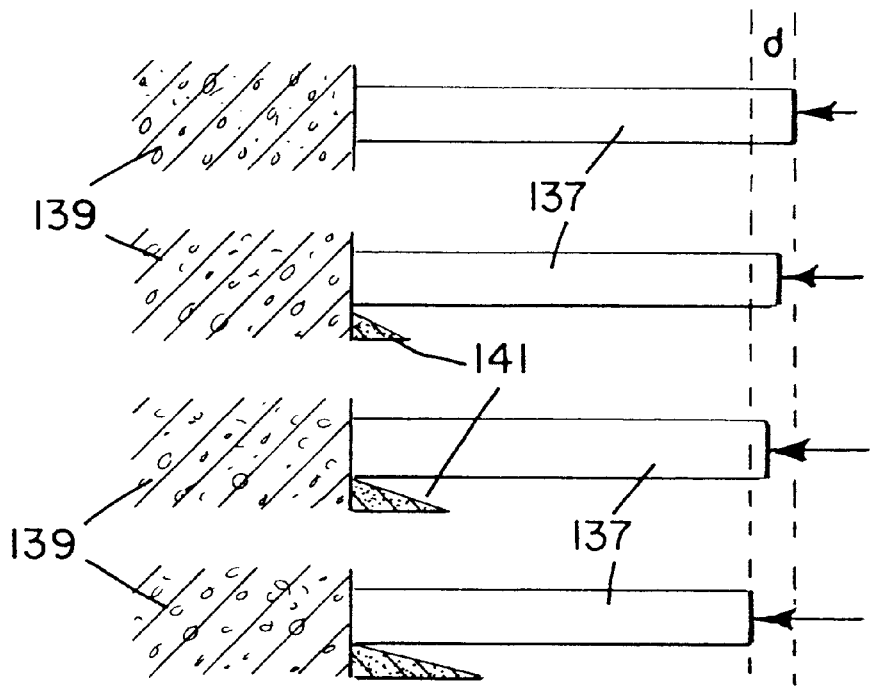
FIG. 30 is a diagrammatic view of a corrosion sequence for a rebar for monitoring corrosion in concrete which shortens over time.
Figure 31:
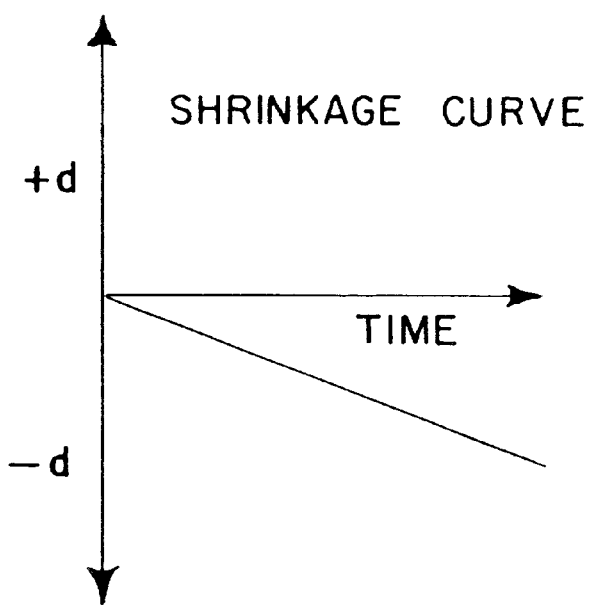
FIG. 31 is a graph illustrating the corrosion over time sequence of the rebar of FIG. 30.

Referring to FIGS. 30 and 31, a rebar-like metal rod 137 in contact with a matrix 139 will corrode at its end which is in contact with the matrix to produce a corrosion product such as rust which sloughs off, a indicated by the reference numeral 141. This causes the metal rod 137 to decrease in size over time as shown in FIGS. 30 and 31.

Figure 28:
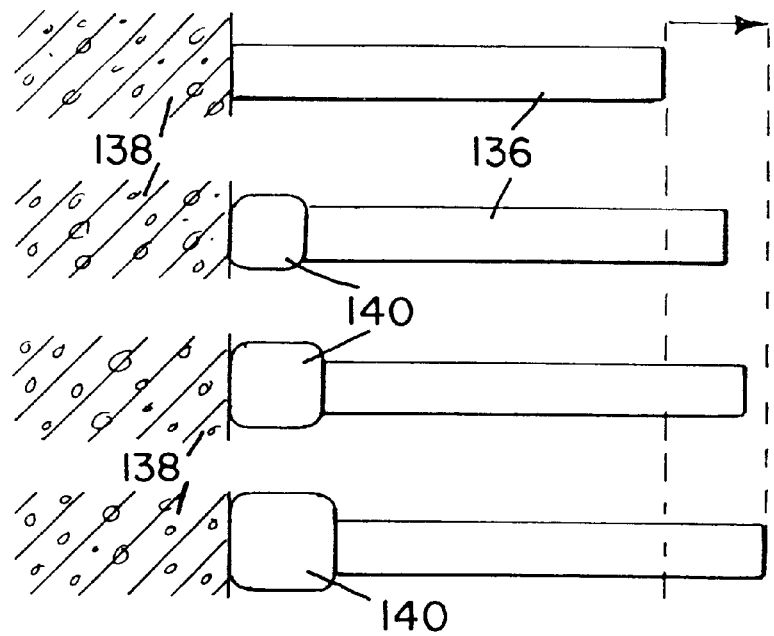
FIG. 28 is a diagrammatic illustration of the corrosion sequence of a rebar for monitoring corrosion in concrete which expands over time.
Figure 29:
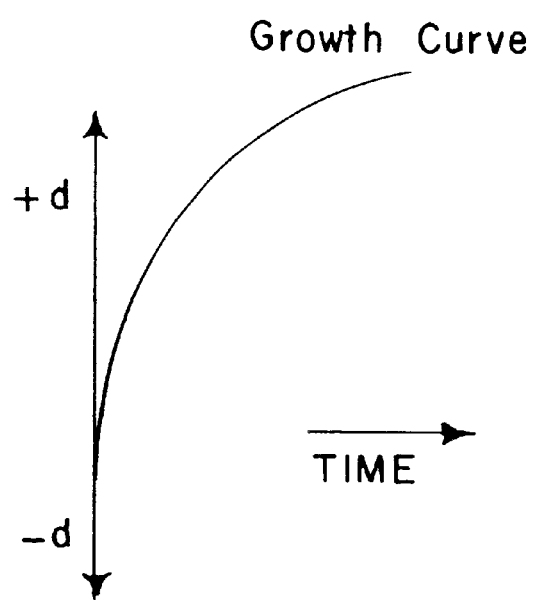
FIG. 29 is a graph showing the corrosion over time sequence of the rebar of FIG. 28.

Referring to FIGS. 28 and 28A a rebar-like metal rod 136 whose distal tip is corroding in contact with the concrete matrix 138 will follow an Error Function (erf) expansion length increase. This initially rapid and then progressively slowing length change is due to the increasing thickness of the corrosion layer, which forms with approximately fourteen times the volume of the metal consumed. This corrosion product 140 forms a barrier which progressively retards the reaction-critical ion counter-diffusion. This modality therefore promises a relatively rapid initial indication of rebar corrosion, but is of questionable future tracking value. It is designated the Corrosion Onset Sensor, COS.

ROD SHRINKAGE SEQUENCE

The concrete deck corrosion monitoring system of the present invention is a retrofit-compatible concept with potential application to virtually every pre-existing or new concrete structure. The Federal Highway Administration had identified over 170,000 US bridges in need of some substantial repair, many of which were due to deck rebar corrosion. One of the nagging problems with such structures as bridges, high-rise parking lots and large building has been the absence of precise and quantifiable information regarding the corrosion state of the rebars and the corresponding need for counter-corrosion measures.

This approach offers an auto-integration of corrosion propensity if the rebar is corroding at a certain location and at a fixed depth, then, it is likely that its neighboring rebars are suffering similar fates. If there is a great deal of variability in corrosion potential within a set structure, then many of the intrinsically simple and incipiently low cost direct visualization sensors may be interspersed with a few number of the full-time and therefore more expensive sensors.

THE LOW COST, DIRECT VISUALIZATION BRIDGE DECK CORROSION SENSOR

Figure 32:
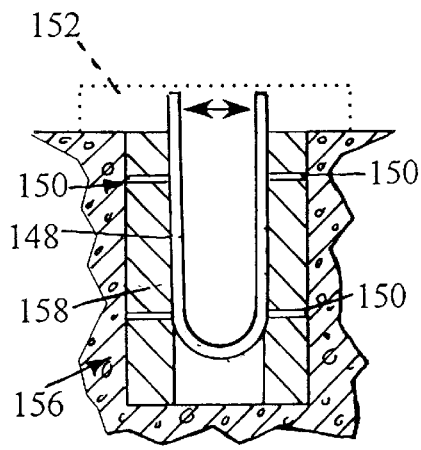
FIG. 32 and 33 is a diagrammatic view of the first environment of a corrosion monitoring sensor for concrete employing rebars which shrink over time.
Figure 33:
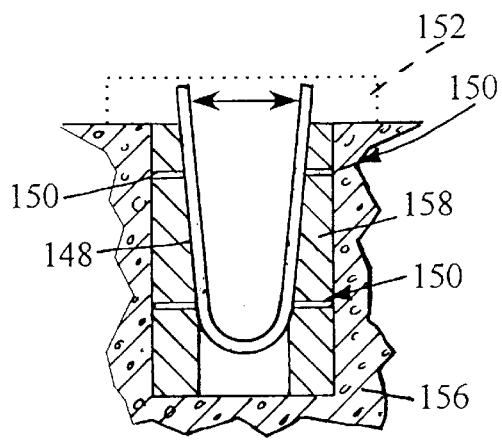
Figure 35:
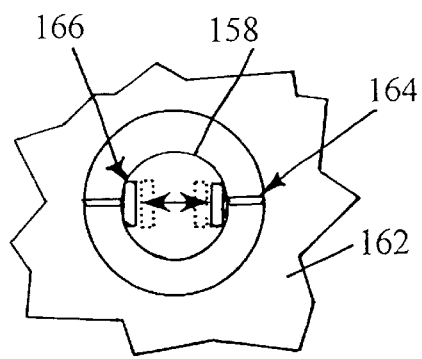

Referring to FIGS. 32 and 33, the system relies on the sacrificial mini rebar rod concept for a remote sensor. The indicator is a bent resilient steel lath 148 held into its bent posture by one or two mini rebar rods 150. When the rods 150 begin to corrode, the lath progressively opens up as shown in FIGS. 33 and 35. A glass observation port 152 is located above the borehole 154. The borehole 154 in the concrete matrix 156 is filled with a silicone filler between the lath 148 and sides of the borehole.

Figure 34:
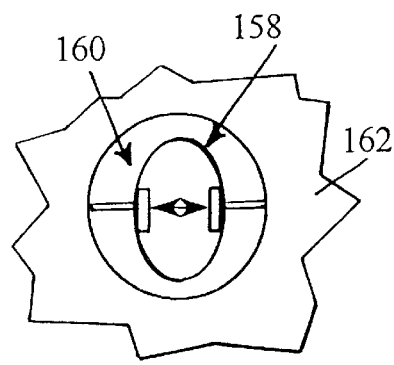
FIGS. 34 and 35 are diagrammatic views of a second modification of a corrosion sensor for concrete having rebars which shrink over time.

Referring to FIGS. 34 and 35, a resilient cylindrical stainless steel tube 158 is inserted in a borehole 160 in the concrete matrix 162. The tube is squeezed into an elliptical shape by mini rebar rods 164. As the rods 164 corrode, the tube 158 returns to its normal cylindrical shape as shown in FIG. 35. Spring indicators 166 are located at the tip of the tube 158 to provide a visual indication of movement of the tube 164 as a result of corrosion of the rods 164. The tube 158 is surrounded by a silicone filler 168.

ALTERNATE CONCEPT

Figure 36:
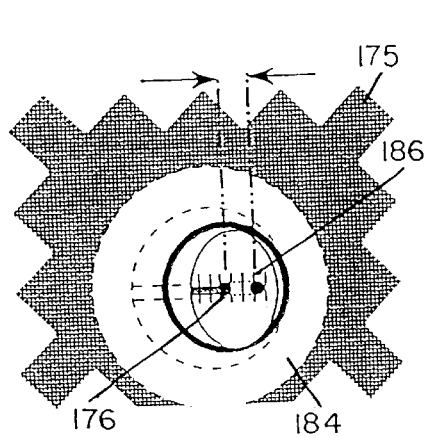
FIGS. 36, 37, 38 and 39 are diagrammatic views of a third modification of a corrosion monitoring sensor for concrete using rebars which shrink over time.
Figure 37:
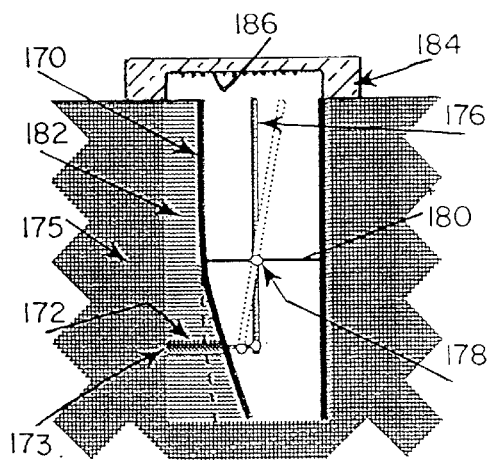

Referring to FIGS. 36 and 37, a right cylindrical resilient stainless steel tube 170 is employed in a borehole 174 in the concrete matrix 175 which has a single mini rebar rod 172 attached at a definite level above the base of the tube. This will become an interference fit in the borehole 174 such that the tube 170 is distorted into an elliptical shape at the rebar's location. This distortion provides the spring impetus maintaining the rebar 172 in contact with the borehole wall, as well as assuring that the rebar will progressively penetrate any corrosion product at the point of corrosion 173.

Any change in ellipticity resulting from corrosion-induced rod shortening will be reflected and magnified by a first degree lever 176 attached to the inside of the stainless steel tube at the rebar's anchor point. Acting through a simple fulcrum at a set distance proximal to the rebar, the lever's opposite extremity will terminate just below the plane of the bridge deck's surface.

The lever 176 is pivoted at 178 to a cross bar 180 which is fixed to the inner surface of the tube 170. The space between the tube 170 and the inner surface of the borehole which is occupied by the rebar 172 is filled with a silicone filler 182. A transparent cap 184 is located at the top of the borehole 174 for visual observation of the change of position of the top of the lever 176 which is indicative of corrosion of the rebar. The cap 184 is provided with a scale 186.

Figure 38:
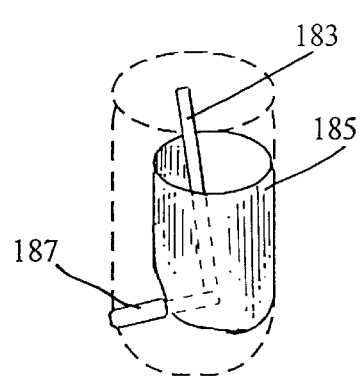
Figure 39:
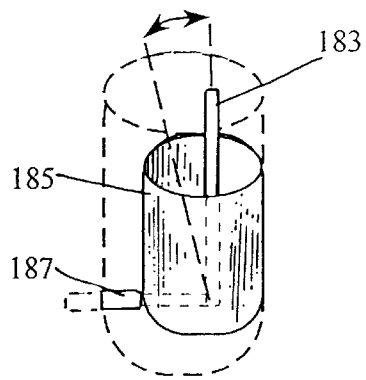

Referring to FIGS. 38 and 39, a right cylindrical stainless steel tube 185 is employed which has a single rebar mini rod 187 attached at a definite level above the base of the tube. This will become an interference fit in the borehole such that the tube is distorted into an elliptical shape at the rebar's location. This distortion provides the spring impetus maintaining the rebar in contact with the borehole wall, as well as assuring that the rebar will progressively penetrate any corrosion product. The tube distortion may be used to actuate an encoder or other remote monitoring device.

Any change in ellipticity resulting from corrosion-induced rod shortening will be reflected and magnified by a first degree lever 183 attached to the inside of the stainless steel tube 185 at the rebar's anchor point. Acting through a simple fulcrum at a set distance proximal to the rebar, the lever's opposite extremity will terminate just below the plane of the deck's surface.

Figure 40:
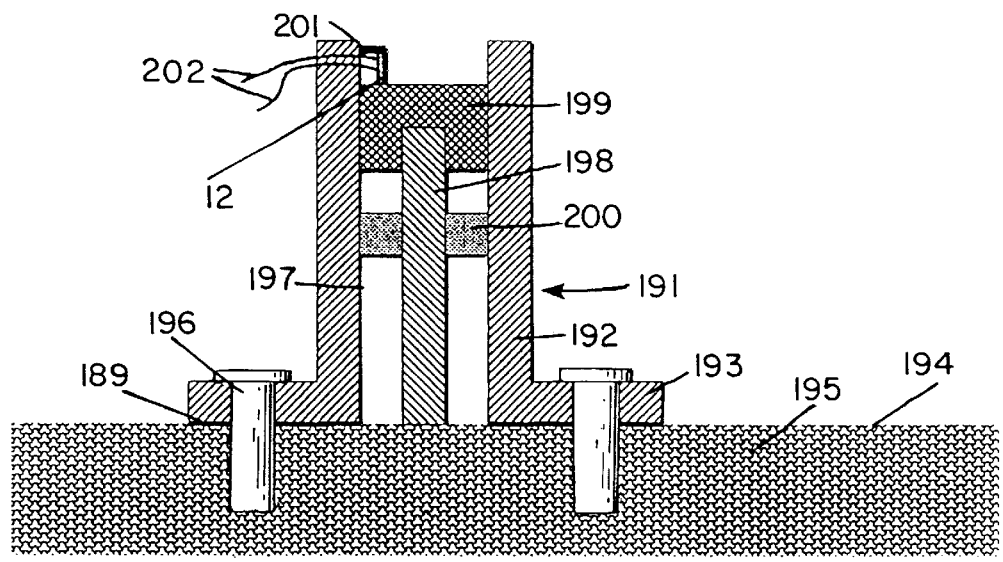
FIGS. 40 and 41 are diagrammatic views of apparatus for monitoring the surface hardness of concrete over time.
Figure 41:
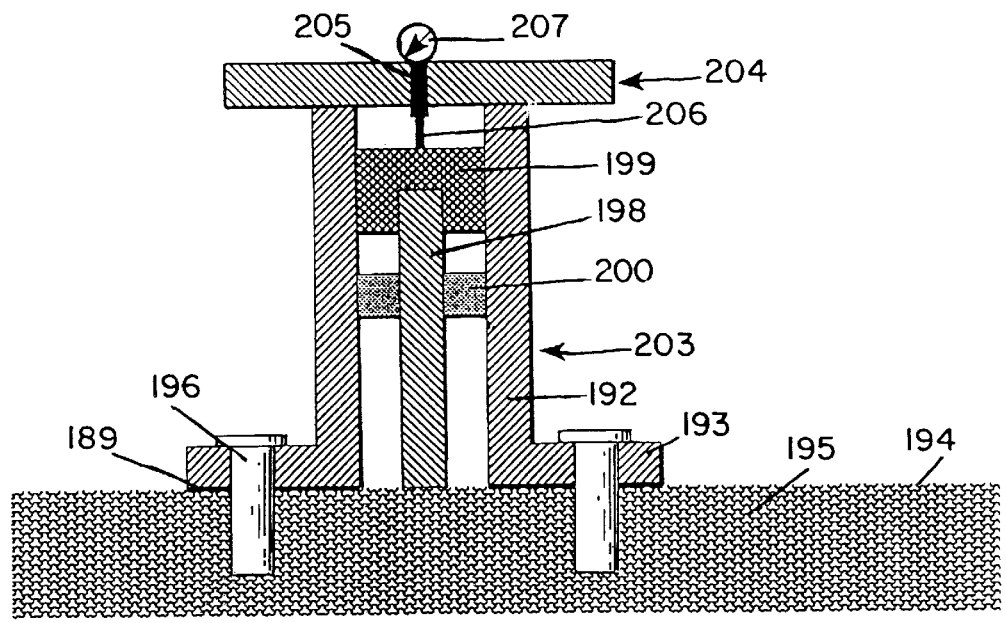

Referring to FIGS. 40 and 41, there is illustrated two embodiments of a surface mounted probe assembly for monitoring the corrosion of concrete. Corroded concrete is referred to in the industry as "punky concrete".

The first embodiment of FIG. 40 is generally indicated by the reference numeral 191 and includes a cylindrical housing 192 which has a cylindrical bore 197 and a bottom outer flange 193. The flange 193 enables the assembly 191 to be mounted to the upper surface 194 of a concrete structure 195 by means of fasteners 196. A sealant 189 is located between the flange 193 and the surface 194 of the concrete. The upper end of a probe 198 is fixed to a cylindrical weighted piston head 199 which is slidably mounted in the bore 197. The lower end of the probe is biased into engagement with the surface 194 by the piston head 199. The downward biasing of the probe 198 could also be provided by a spring. An elastomeric sealant 200 is located between the probe 198 and the inside surface of the bore 197. The housing portion of an optical sensor 12 is fixed to the housing 192 of the probe assembly by a housing anchor 201. The probe portion of the sensor 12 is biased downwardly against the upper end of the piston head 199. The sensor 12 is operatively connected to the fiber optic cable by optical fibers 202. Corrosion or softening at the surface 194 of the concrete will cause the probe 198 to be moved downwardly by the weight of the piston head 199. This movement of the probe 198 causes the probe portion of the sensor 12 to move downwardly relative to the housing portion of the sensor, thereby producing an optical signal which is indicative of the softening condition of the concrete.

The second concrete monitoring assembly illustrated in FIG. 41 is generally indicated by the reference 203. Assembly 203 is identical to assembly 191 except that it does not include a sensor 12. The elements of assembly 203 which are identical to assembly 191 are identified by the same reference numerals. The probe assembly 203 includes a removable top cover 204 which is mounted on the cylindrical housing 192 above the piston head 199. A micrometer 205 is mounted in the cover 204. The micrometer includes a stilus 206 which extends below the cover for engaging the upper surface of the piston head 199 and a gauge 207 located above the cover. Any downward movement of the probe 198 resulting from corrosion or softening of the concrete can be read directly from the gauge 207.

FATIGUE FUSE

A fatigue fuse is a pre-weakened metal member which is attached to a structure which may experience fatigue failure problems. The fuse member experiences the strain history of the structure and fractures at its pre-weakening notch site after a known accrual of fatigue. Fuses are generally made in sets of four with a sequenced fracture profile.

Figure 42:
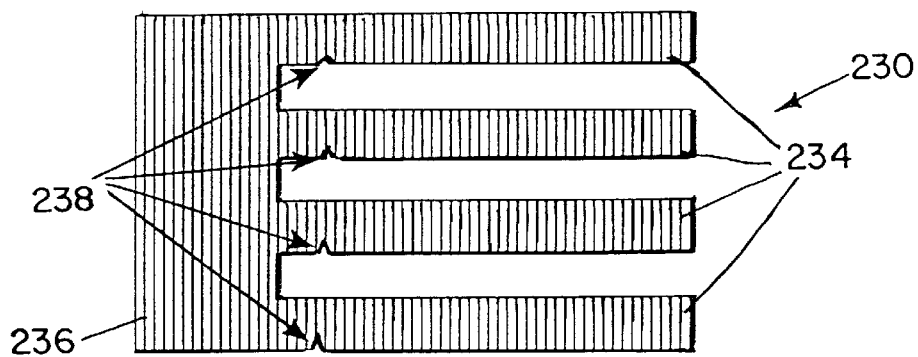
FIG. 42 is a top plan view of the reflective grid portion of a fatigue fuse embodying the principles of the present invention.
Figure 43:
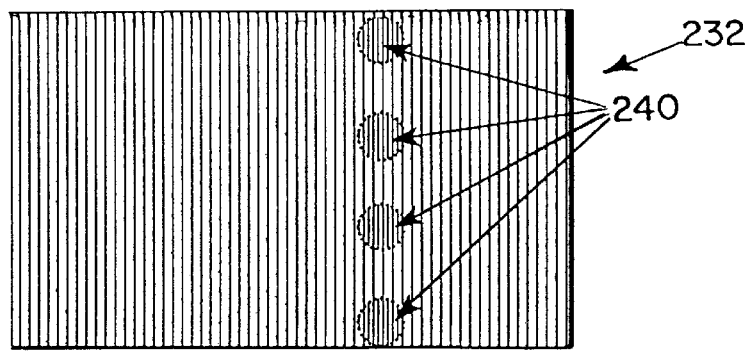
FIG. 43 is a top plan view of the transmissive mask portion of a fatigue fuse of the present invention.
Figure 44:
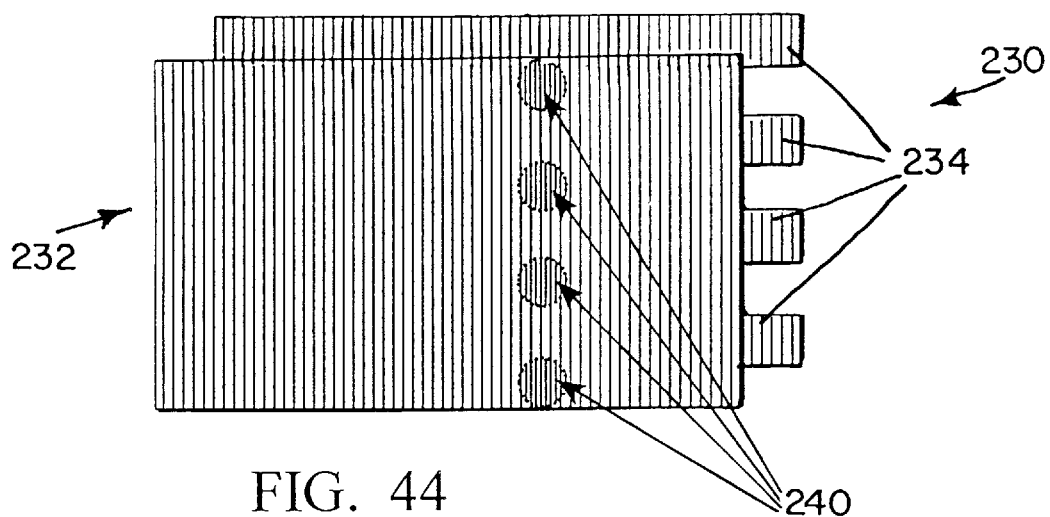
FIG. 44 is a top plan view of the reflective grid and transmissive mask portions of FIGS. 42 and 43.

Referring to FIGS. 42–45, the fatigue fuse monitoring system of the present invention includes a reflective grid generally indicated by the reference numeral 230 in FIG. 42 and a transmissive mask, generally indicated by the reference numeral 232, in FIG. 43. The reflective grid 230 includes a plurality of parallel spaced tines 234 extending from a base 236. Each tine 234 has a small notch 238 which functions as a fatigue initiator. The transmissive mask of FIG. 43 has a plurality of spaced fiber optic connector locations 240 which correspond to the spacing of the tines 234 as depicted in FIG. 44 which shows the grid 230 overlaying the mask 232.

Figure 45:
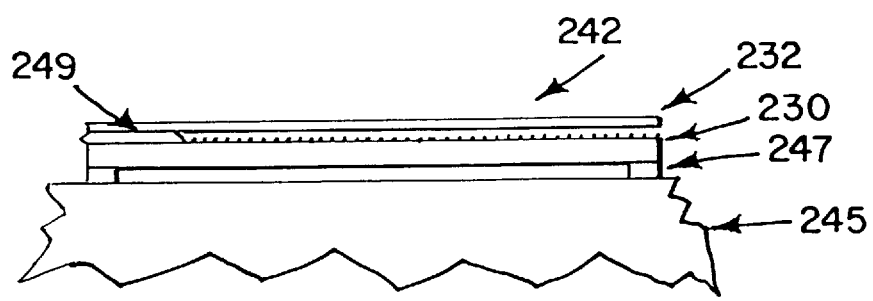
FIG. 45 is a side elevational view of a fatigue fuse of FIG. 44 shown applied to a structure to be monitored.

The assembled fatigue fuse assembly is generally indicated by the reference numeral 242 in FIG. 45. The reflective grid portion 230 of the fatigue fuse is attached to a substrate 245 being monitored by an adhesive 247. The base 236 of the transmissive mask portion of the fatigue fuse is fixed to the reflective grid portion of the fuse at 249.

The reflective grid 234 has a periodicity of 30 microns, which matches the fuse movement once the fatigue-initiated crack has propagated fully across the affected fuse leg or tine 234. When illuminated through the equivalently set up Transmission Mask, as shown in FIG. 43, the reflected light signal will change in magnitude by comparison with the other unaffected fuses.

STEREOGRAPHIC REPRESENTATION OF MASK OVER FUSE

Fatigue monitoring, a development of Materiall Technology, Inc., "MaTech", is a remarkable achievement because it comprises the imperative two-step process which first evaluates the fatigue already present in the metal member and then goes on to continuously monitor that same member on a quantitative basis from the freshly established baseline.

The first phase, which is to diagnose the accumulated fatigue, is a one time hands-on procedure which, appropriately, yields an EKG-like waveform output which is interpreted. The result is an assessment of the level of the fatigue present in the member at that instant, to an accuracy of about 15 percent.

The second part of this fatigue equation is the Fatigue Fuse. The four-tined comb as shown in FIG. 42 is made from the same composition alloy as the member under investigation. The Fuse assemblage is cemented to the member at its extremities and therefore compelled to faithfully experience the very same surface stresses as the member itself from that time forward.

Each tine is preconditioned to fail at a different, say, 10 percentage increment of additionally accumulated fatigue. Thus, if the member had been diagnosed as evidencing a 40 percent fatigue level when the Fatigue Fuse was attached, each fuse failure will signal the additional 10 percent increments in a progressive fail-soft and remediable manner. The cable interrogation system has been configured to detect the minute 40 micron fuse failure cracks as they occur.

FUSE OPTICAL INTERROGATION AND STRAIN GAUGE ATTRIBUTES

The optically-interrogated Fatigue Fuses can provide exactly the type of data currently gathered in conventional strain gauge monitoring system, such as Lockheed Martin's IHUMS inferential fatigue monitoring approach, at least up to the point where they actually fatigue to fracture failure. At failure, of course, they are indicating in the most assertive manner that a critical accumulated strain datum of fatigue has been reached, regardless of what any inference-based software is indicating. This offers the best of both worlds.

With the optically-interrogated Fuse, one has an accelerometer whose constantly-monitored vibration signature lends itself directly to FFT analysis and the fundamental frequency information available gleaned therefrom. In addition, it provides a digital and therefore absolute value of any vibration amplitude excursions.

Optimally then, the Fuse System offers all of the standard strain gauge information plus the reassurance of the actual fuse fracture event and an adjacent and greater longevity fuse ready to assume the task of generating ongoing accelerometer data after the first fuse has failed.

The attraction of this scenario is that the same fatigue fuse which will eventually fracture will provide sub-critical strain accumulation data up to the point when it actually does fracture. These data will be amenable to fatigue-predictive manipulation. As such, this non-invasive and auto-generated data source should greatly assist in joint fatigue modeling and aid considerably in design refinement leading to a more basic understanding of the various uniform and jointed structure fatigue phenomena. An example of fuse testing results is shown in FIG. 46.

FATIGUE FUSES: REPRODUCIBILITY OF TEST DATA

More than 50 precision Fatigue Fuses with 200 notched Tines have been Fatigue Tested Most tests employed long variable stress sequences to simulate realistic conditions Variables included: Fuse Material, Adhesive, Size of bond area, Shape of Fatigue notch, Thickness of fuse Multiple replicates were employed Scatter in results is relatively small Fatigue Tines fail in the programmed sequence, indicating the progressive fatigue experienced by the substrate

BUILDING MONITORING

The present system incorporates many conductors, most of them optical fiber. In the inter-high-rise building movement monitoring and fire detection scenarios, it is very desirable from a code and ease of implementation standpoint that there only be optical fibers or aramid fiber components since both are non-conductive and therefore present no electrical hazard. The Building Movement and Fire Detection System was developed using a combination of a digital encoder sensor-fiber optic interrogation harness in combination with a series of aramid drone cables. Using an aramid cable as the linkage medium between critical structural building members and the encoders, and the fiber cable harness as the sensor interrogation means, it is possible to create a whole-building network of sensors which will respond to building motions in any of the x, y, z coordinate directions.

The advantage of the aramid cable is that it is very flexible but inextensible and with virtually zero thermal expansion. Further, it is extremely strong and light in weight. Thus, it perfectly lends itself to deployment as a web network throughout large structures, typically placed above dropped ceiling and well out of the way.

Any motion in the building which causes the encoder-tensioned aramid cables to elongate or to shorten, such as during an earthquake, will immediately translate into encoder motion, in turn instantaneously transmitted back to the base computer monitoring system for analysis and response. In the event of a fire, the aramid drone cables' deployment in sprinkler-grade wax captured convolutions, see FIG. 47, will trigger site-specific sensor changes which may be computer recognized as distinct from earthquake events by their specificity. This will simply come about from the aramid cables' convolution release as the ambient temperature rises to soften the wax adhesive.

Figure 47:
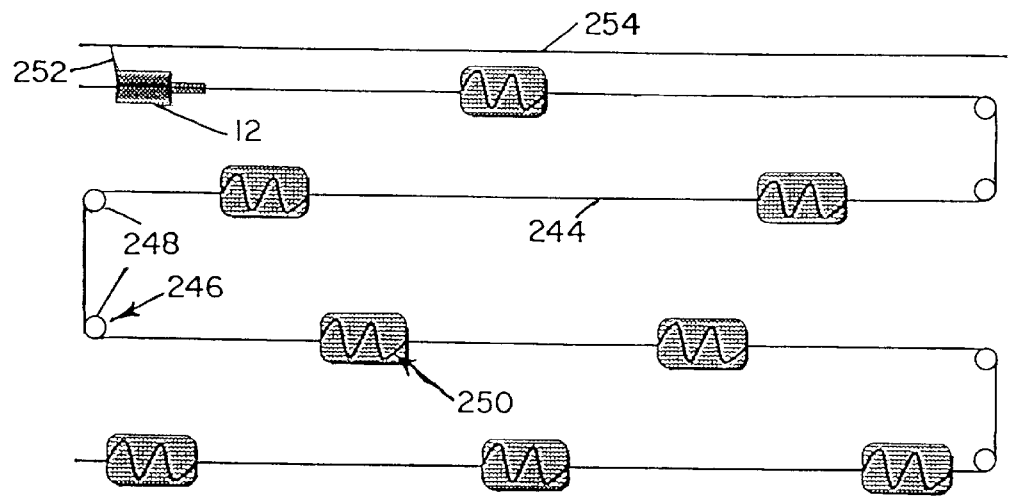
FIG. 47 is a diagrammatic view of the monitoring system of the present invention as applied to monitoring temperature.

The drone aramid cables 244 may also be deployed using a simple pulley system generally indicated by arrow 246, as shown in FIG. 47, which increases the area coverage for fire detection. The pulleys 248 attached to the east-west walls only in this representation so that any changes in the drone cable will be due either to wax melting in one or more the wax-enclosed S-shaped cable sections 250 else specific relative displacement of the east-west walls. Further, the displacement will be directly proportional to the wall movement, albeit reduced by a pulley reduction factor. Given the high resolution capability of the Digital Sensor, this "pulley-induced demagnification effect" is not a problem. The drone cable 244 is connected to a sensor 12. An optical fiber 252 from a fiber optic cable 254 is connected to the sensor 12.

BUILDINGS AND BRIDGES

Bailey Bridge integrity, and other perhaps more permanent critical military structures would be excellent candidates for the system of the present invention, where the ease of uncoiling and deploying this two-way-reflective and therefore essentially one-ended "rope with ornaments attached" is readily adapted to a wide array of geometries. This system has the ability to instantly report on the "health" of high-rise buildings, post-earthquake. The military theater has much in common with earthquake-prone terrain from the standpoint of jarring vibrational damage and so may see useful parallels.

NAVAL VESSELS AND AIRCRAFT

Another military fit for the Fatigue Fuse of the present invention is obviously airframes and oil tanker structural monitoring, naval vessels are obvious candidates. The non-electric aspect of the fiber optic system should play here, in what would be a literally explosive environment, as well as it does in the equally dangerous milieu of oil freighters. In addition, the bolt clamp load monitoring system of the present invention will also fit in well here, particularly on some of the newest model airframes.

TEMPERATURE MONITORING

Figure 48:
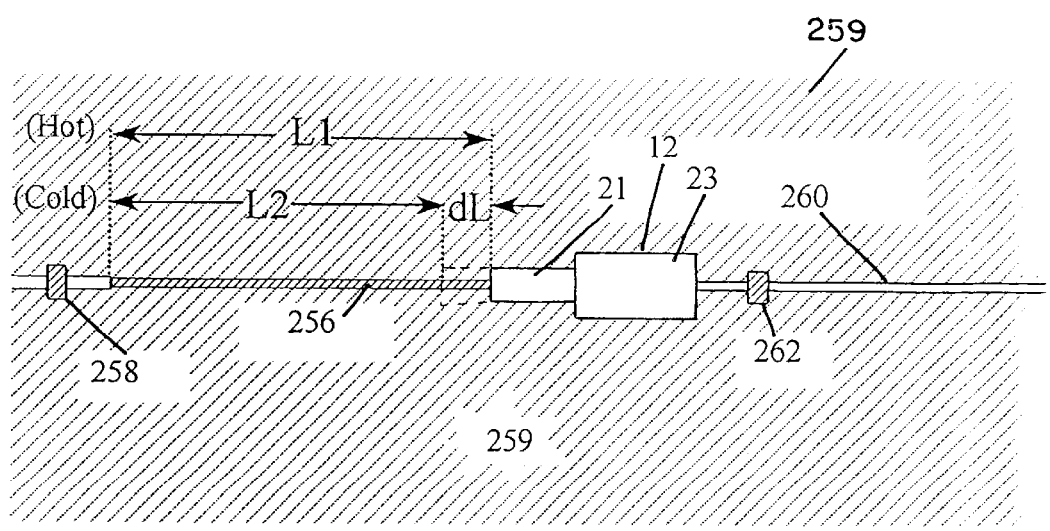
FIG. 48 is a diagrammatic view of a modification of the monitoring system of the present invention for monitoring temperature.

On at least one shaded portion of the bridge structure which is known to be extremely rigid, a section of thermally expandable cable will be utilized to deliberately react to changes in temperature. This is because several sections of the bridge structure will include metallic members which will expand and contract with temperature fluctuations. In order to be able to separate these effects from, for example, legitimate structural shifts as recorded by the relevant motion sensors, the corrective factor must be known. Referring to FIG. 48, one end of a temperature expanding cable 256 is fixed to an anchor 258 on the bridge structure 259. The other end of the expanding cable 256 is fixed to the probe portion 21 of a sensor 12. An aramid fiber cable 260 which does not expand. As a result of increases in temperature is fixed to the housing portion 23 of the sensor 12 to an anchor 262 which is fixed to the bridge structure 259.

FUNCTION

Referring to FIG. 66, the temperature-related changes of the Expanding Cable will be detected through the accommodating motion within the optical encoder. These changes will occur according to the laws of thermal expansion and contraction.

These state that the change in length, L1−L2=dL will be:

$$dL = L1 \times Tc \times (T1-T2),$$

where: Tc is the thermal expansion coefficient of the Expanding Cable

T1 is the starting temperature in degrees Celsius, and

T2 is the ending temperature in degrees Celsius

Note that the Drone cable is made of Kevlar which has a zero temperature coefficient of expansion.

What is claimed is:

1. Apparatus for monitoring a structure comprising:

(a) a source of power;

(b) a transceiver connected to said source of power for transmitting and receiving pulses of light;

(c) a plurality of optical sensors for deployment on said structure, at least one of said sensors having a first element operatively connected to a first part of said structure and a second element movable relative to said first element and operatively connected to a second part of said structure, at least one position of said second element relative to said first element being a first state of said sensor and at least one position of said second element relative to said first element being a second state of said sensor, each of said sensors being capable of receiving pulses of light in said first and second states and for transmitting said pulses of light in said second state;

(d) a cable of optical fibers for development said structure, said cable having at least one plurality of optical fibers operatively connected to said transceiver, each of said sensors being connected to at least one of said optical fibers for transmitting said optical pulses from said transceiver to said sensor and for returning said optical pulses from said sensor to said transceiver when said sensor is in its second state; and (e) the first and second elements of at least one of said sensors being connected to said structure by a drone cable so that changes in a selected condition of said structure are transmitted to said one sensor through said drone cable, thereby enabling said drone cable to be made of a material which has desirable characteristics for physically transmitting changes in the selected condition of said structure and for deployment in environmentally hazardous areas and enabling said cable of optical fibers to passively deploy in environmentally safe areas of the structure.

2. Apparatus for monitoring a structure as recited in claim 1, wherein said drone cable is made of an aramid fiber.

3. Apparatus for monitoring a structure as recited in claim 1, wherein said optical sensor has a first element and a second element which is movable relative to said first element, said drone cable having a first length which is connected to a first part of said structure and to said first element and a second length which is connected to a second part of said structure and to said second element.

* * * * *